(12) United States Patent
Narayanaswamy et al.

(10) Patent No.: US 12,265,779 B2
(45) Date of Patent: Apr. 1, 2025

(54) CLOCK AWARE SIMULATION VECTOR PROCESSOR

(71) Applicant: Synopsys, Inc., Mountain View, CA (US)

(72) Inventors: Ramesh Narayanaswamy, Palo Alto, CA (US); Subramanian Ganesan, Cupertino, CA (US); Dinesh Madusanke Pasikku Hannadige, Dodanduwa (LK)

(73) Assignee: Synopsys, Inc., Sunnyvale, CA (US)

( * ) Notice: Subject to any disclaimer, the term of this patent is extended or adjusted under 35 U.S.C. 154(b) by 565 days.

(21) Appl. No.: 17/555,204

(22) Filed: Dec. 17, 2021

(65) Prior Publication Data
US 2022/0198120 A1  Jun. 23, 2022

Related U.S. Application Data

(60) Provisional application No. 63/127,581, filed on Dec. 18, 2020.

(51) Int. Cl.
*G06F 30/398* (2020.01)
*G06F 119/12* (2020.01)

(52) U.S. Cl.
CPC ........ *G06F 30/398* (2020.01); *G06F 2119/12* (2020.01)

(58) Field of Classification Search
CPC .. G06F 30/394; G06F 30/398; G06F 2119/12; G06F 30/3323; G06F 30/3308; G06F 15/8053; G06F 9/3861; G06F 9/3877; G06F 9/4403

USPC ........................................................ 716/136
See application file for complete search history.

(56) References Cited

U.S. PATENT DOCUMENTS

| | | |
|---|---|---|
| 6,321,366 B1 | 11/2001 | Tseng et al. |
| 6,480,988 B2 | 11/2002 | Ganesan et al. |
| 6,691,287 B2 | 2/2004 | Ganesan et al. |
| 2007/0074000 A1 | 3/2007 | Colwill et al. |

(Continued)

OTHER PUBLICATIONS

Interational Application No. PCT/US2021/084205, International Search Report and Written Opinion, dated Mar. 16, 2022, consists of 14 pages.

(Continued)

*Primary Examiner* — Paul Dinh
(74) *Attorney, Agent, or Firm* — Patterson + Sheridan, LLP

(57) ABSTRACT

A processing system for validating a circuit design, the processing system includes a flow processor, and an evaluation system coupled with the flow processor. The flow processor generates instructions from the circuit design. The evaluation system includes instruction memory circuitry receives the instructions from the flow processor and generate control signals, and interconnect circuitry receives the control signals routes a plurality of values based on the control signals. Each of the plurality of values having one of four states. The evaluation further includes operation circuitry that receives the plurality of values and the control signals, performs one or more operations of the circuit design with the plurality of values based on the control signals, and outputs operation values based on performing the one or more operations, the operation values indicative of an error within the circuit design.

14 Claims, 9 Drawing Sheets

(56) References Cited

U.S. PATENT DOCUMENTS

| | | | | |
|---|---|---|---|---|
| 2007/0229125 A1* | 10/2007 | Tsuruta | .................... | H03K 5/08 |
| | | | | 327/124 |
| 2008/0122490 A1* | 5/2008 | Kao | ..................... | H03K 5/1534 |
| | | | | 327/24 |
| 2023/0089869 A1* | 3/2023 | Turan | ....................... | G06N 3/04 |
| | | | | 716/112 |

OTHER PUBLICATIONS

Stuart Sutherland, "I'm Still in Love with my X!" DVCON 2013, dated Feb. 28, 2013, 20 pages.
Interational Application No. PCT/US2021/064205, International Preliminary Report on Patentability, dated Jun. 29, 2023, consists of 8 pages.

* cited by examiner

CLOCK AWARE SIMULATION VECTOR PROCESSOR

RELATED APPLICATION

This application claims the benefit of U.S. provisional patent application Ser. No. 63/127,581, filed Dec. 18, 2020, which is hereby incorporated herein by reference.

TECHNICAL FIELD

The present disclosure generally relates to a simulation acceleration processor. In particular, the present disclosure relates to a system and method for providing a clock aware simulation vector processor.

BACKGROUND

Logic simulation is used to verify the functional correctness and design intent of a circuit design (e.g., a Design Under Verification (DUV)). Functional correctness is verified by applying values to the inputs and internal variables of a DUV, simulating the applied inputs through the DUV, and checking outputs of the DUV for expected behavior. Verifying the functional correctness of a DUV includes checking that the internal variables of the DUV reach an expected value (e.g., a value of 0) based on a reset input sequence, and that the output of a DUV has an expected result for applied inputs (e.g., an add operation produces the sum of the inputs on the output).

The amount of computation resources used performing logic simulation of circuit designs corresponds to the size of a circuit design. Accordingly, as the size of the circuit design increases, the amount of computation resources increases.

SUMMARY

In one example, a processing system comprises a flow processor and an evaluation system. The flow processor generates instructions based on an input signal associated with a circuit design. The evaluation system electrically is coupled with the flow processor. The evaluation system receives the instructions and performs operations of the circuit design based on the instructions. The evaluation system includes instruction memory circuitry that receives the instructions from the flow processor and generates control signals. The evaluation system further includes interconnect circuitry electrically coupled to the instruction memory circuitry. The interconnect circuitry receives the control signals and a plurality of values, and routes the plurality of values based on the control signals. Each of the plurality of values having one of four states. Further, the evaluation system includes operation circuitry is electrically coupled to the interconnect circuitry and the instruction memory circuitry. The operation circuitry receives the plurality of values and the control signals, performs one or more operations of the circuit design with the plurality of values based on the control signals, and outputs operation values based on performing the one or more operations, the operation values indicative of an error within the circuit design.

In one example, a method includes generating instructions based on an input signal associated with a circuit design, and generating, via instruction memory circuitry, control signals from the instructions. Further, the method includes routing, via interconnect circuitry, a plurality of values based on the control signals. Each of the plurality of values having four states. The method further includes performing, via operation circuitry, one or more operations of the circuit design with the plurality of values based on the control signals, and outputting operation values based on performing the one or more operations. The operation values indicative of an error within the circuit design.

In one example, a method includes storing a first value associated with a circuit device at a first period, and detecting an edge of a first clock signal associated with the circuit device. Further, the method includes outputting, from the circuit device, the stored first value based on detecting the edge of the first clock signal.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
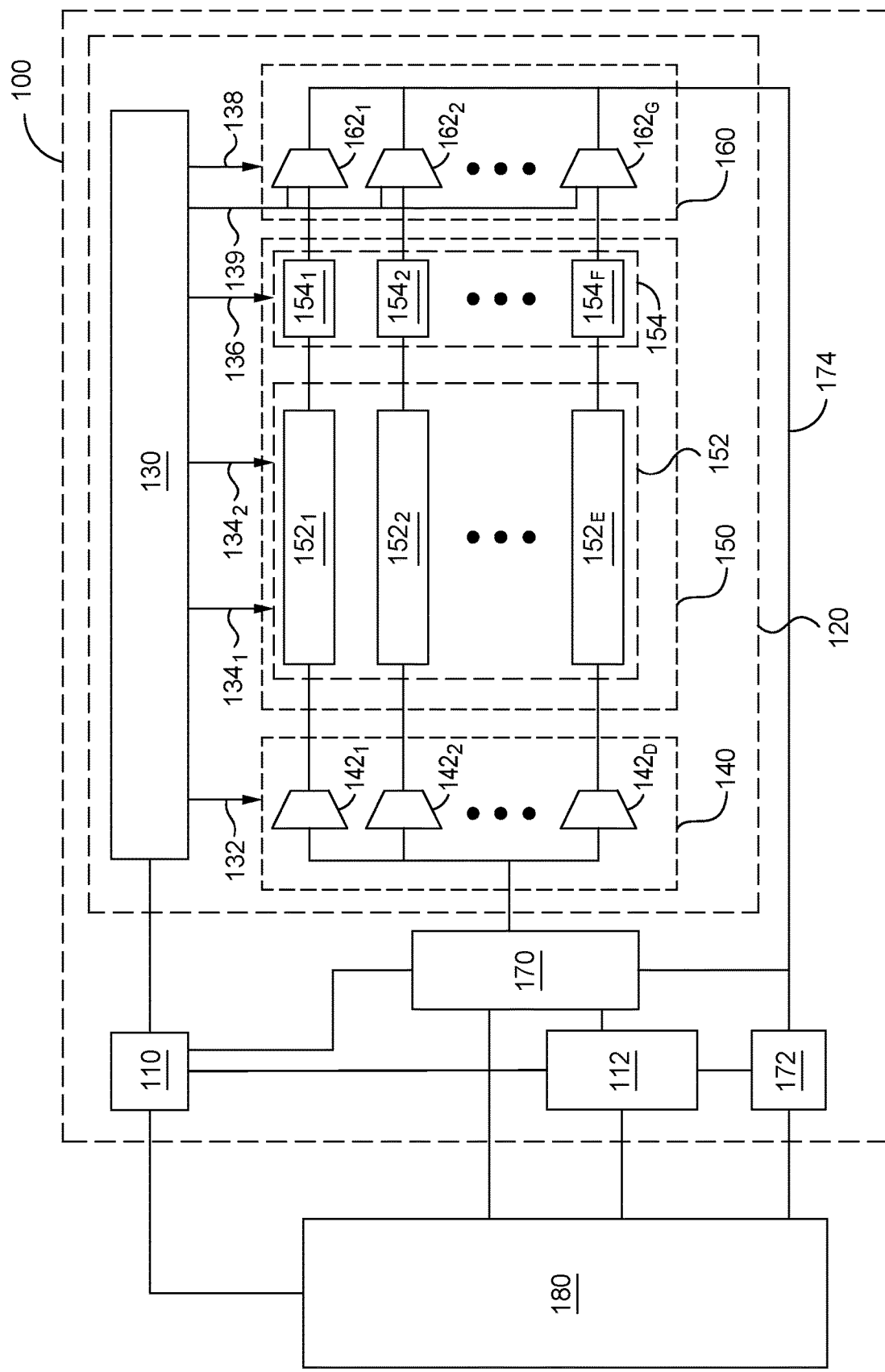
FIG. 1 illustrates a block diagram of a simulation vector processor system, according to one embodiment of the present disclosure.

Aspects of the present disclosure relate to a clock aware simulation vector processor.

A design (e.g., circuit design) under verification or test (DUV or DUT) may include very-large-scale integration (VLSI) circuit blocks and VLSI Chips, among others. A DUV is simulated to determine functional correctness and design intent. Determining functional correctness includes analyzing the outputs of a DUV based on simulated inputs.

Design intent includes checking design behavior of a DUV by specifying the expected sequence (e.g., the expected values) of behavior using hardware description language (e.g., System Verilog or others) assertions, and verifying that a DUV operates correctly when parts of the DUV are disabled and re-enabled based on a power intent. The power intent is specified in low power specifications (e.g., a Unified Power Format or other power format specification for low power techniques) that are part of the DUV.

A DUV may be modeled using four states (e.g., a 4-state model). The four states include a zero value state (e.g., a logic value of 0), a one value state (e.g., a logic value of 1), an unknown state (e.g., an X value) and a tristate (e.g., a Z value). A 4-state model is used to verify that a DUV properly recovers after a reset procedure. For example, a 4-state model may be used to determine whether or not a DUV returns to a known state (e.g., a value of 0 or 1) or an unknown state (e.g., an X value) after a reset procedure. In one example, a reset procedure sets one or more variables of a DUV to a known value (e.g., a value of 0 or 1). However, based on the detection of variables within a DUV having an X value after a reset procedure, errors within the DUV are indicated.

The logic simulation processes to verify a circuit design is a computational intensive process. Accordingly, as the size of circuit designs increase, the processing resources used by a logic simulation process increase. Further, logic simulation processes that use a 4-state model to simulate the operation of a circuit design are more computational intensive than other logic simulation processes. Embodiments disclosed herein employ a simulation vector processor system that simulates the operations of a DUV to verify the functional correctness and design intent of the DUV. The simulation vector processor system uses a parallel hardware implementation to simulate the operations of the DUV. Further, the simulation vector processor employs a 4-state model to verify that the DUV returns a known value of a reset procedures, or other power related procedures. For example, the elements of the simulation vector processor system support 4-state values and operate using a parallel hardware implementation. Accordingly, the simulation vector processor system is able verify a larger number of operation procedures of a DUV, and in a reduced amount of time, e.g., approximately ten to fifty times, as compared to typical methods. The embodiments described herein present an instruction set that enables a fast compilation of a DUV, and an improved verification interface for efficiently setting and checking input values, output values, and internal variables of a DUV as compared to typical methods.

FIG. 1 illustrates a simulation vector processor system 100, according to one or more examples. The simulation vector processor system 100 may be referred to as a vector processor including one or more processors that are used to verify a circuit design. The simulation vector processor system 100 includes a flow processor 110 and evaluation circuit 120. In one or more examples, the simulation vector processor system 100 further includes data circuitry 170 and trace circuitry 172.

The simulation vector processor system 100 is coupled to a testing device 180. The testing device 180 generates instructions from a DUV and communicates the instructions to the simulation vector processor system 100. The instructions indicate which portions of a DUV that are to be simulated. In one example, the instructions are in the form of one or more clock signals. Each of the clock signals correspond to a different portion of a DUV. Further, the testing device 180 communicates one or more data signals (e.g., input signal values and/or variable values) to the simulation vector processor system 100. The simulation vector processor system 100 evaluates the DUV by simulating one or more operations of the DUV based on the data signal.

In one example, a DUV is modeled as an interconnected plurality of processes (e.g., operations). Each process includes one or more input variables and one or more output variables. Further, each process is a 4-state process. During a verification processes, an input values is received for each corresponding variable and used to produce output values corresponding to the plurality of output variables.

The simulation vector processor system 100 provides a number of operators for declaring, reading, writing, initializing/setting the memory. In one example, the operators include a memory space declaration operator that reserves space for a memory multi-dimensional array (MDA) such that the reserved space is for a 4-state representation of the MDA. The operators include a memory read operator that reads a value from the memory based on an address such that the read operator may be split into a read request operator and read inject operator. The operators include a memory write operator writes a value to the memory based on an address. The operators include a memory initialization (e.g., set) operator that sets the memory or address range of memory to one of a 4-state value.

The flow processor 110 is coupled to the testing device 180. The flow processor 110 receives circuit design data (e.g., instructions) from the testing device 180. The flow processor 110 is one or more processors such as a microprocessor, a central processing unit, or the like. Further, the flow processor 110 may be a complex instruction set computing microprocessor, a reduced instruction set computing microprocessor, a very long instruction word microprocessor, or a processor implementing other instructions sets, or processors implementing a combination of instruction sets. In one or more examples, the flow processor 110 is one or more special-purpose processing devices such as an application specific integrated circuit (ASIC), a field programmable gate array (FPGA), a digital signal processor (DSP), and/or a network processor, among others. The flow processor 110 executes instructions for performing the corresponding operations described herein.

The circuit design data corresponds to instructions that are to be evaluated by the evaluation circuit 120. In one example, the circuit design data includes a clock signal associated with instructions to be evaluated by the evaluation circuit 120. The flow processor 110 includes one or more edge detectors configured to detect a rising edge or a falling edge of a clock signal and select a subset of the circuit design for evaluation based on the detected clock signal edge. In other examples, the circuit design data includes more than one clock signal, and the flow processor 110 detects an edge of each of the clock signals. Depending on which clock signal or signals where an edge was detected, a corresponding portion or portions of the DUV are selected for simulation. The instructions associated with selected portion or portions of the DUV are output to the evaluation circuit 120.

The evaluation circuit 120 includes instruction memory circuitry 130, interconnect circuitry 140, and operation circuitry 150. The evaluation circuit 120 is electrically connected to the flow processor 110 via one or more traces. The evaluation circuit 120 receives instructions output by the flow processor 110. The evaluation circuit 120 performs operations associated with the DUV based on the instructions to evaluate the circuit design under test. Further, the evaluation circuit 120 receives values. The values are received from data circuitry 170 of the simulation vector processor system 100. The values may be a signal of one or more bits. In one example, the values may be logic value 0, a logic value 1, an X value, or a Z value. The values are used with the instructions to perform the operations of the circuit design under test to evaluate the DUV.

The instruction memory circuitry 130 receives the instructions from the flow processor 110 and generates control signals. For example, the instruction memory circuitry 130 generates interconnect control signal 132, read control signals $134_1$, write control signals $134_2$, and operator control signals 136. The instruction memory circuitry 130 may further generate the force memory control signals 138. In one example, the instruction memory circuitry 130 generates the interconnect control signal 132, the read control signals $134_1$, the write control signals $134_2$, and the operator control signals 136 by determining which operations are to be executed and which values are operated on at different clock cycles of an evaluation clock signal. The clock cycles of the evaluation clock signal may be referred to as cycles.

In one example, the instruction memory circuitry 130 generates the control signals 132 to instruct the interconnect circuitry 140 to couple a first value to a memory location within the operation circuitry 150 from the instructions provided by the flow processor 110.

The read control signals $134_1$ include 4 read pointers and the write control signals $134_2$ include 4 write pointers for the 4 states (e.g., a state of logic value 0, a state of logic value 1, a state of an unknown value, and a tristate. Taken together, the read control signals $134_1$ and the write control signals $134_2$ instruct the operation circuitry 150 as to which addresses to read data and which address to write data.

The operator control signals 136 include operation instructions. The operator control signals 136 are received by the operation circuitry 150 and instruct the operation circuitry 150 as to which operations to perform. The operations include conditional operations, test operations, four state test operations, arithmetic operations greater than operations, less than operations, logical equality operations, case equality operations, arithmetic operations, logical operations, and shift operations, among others. Conditional operations include if-else operations, case operations, and ternary operations, among others. Test operations include greater than, less than, and logical equality operations, among others. Four state test operations include case equality operations. The four state test operations compare two signals represented as four state values (e.g., a logic value 0, a logic value 1, an unknown value (e.g., X value) and a Z value). Four state operations use additional logic support comparisons of signals that can be one of the four states (e.g., a logic value 0, a logic value 1, X value and a Z value). Arithmetic operations include addition operations, subtraction operations, multiplication operations, division operations, and exponent operations, among others. Shift operations include left shift operations and right shift operations. Logical operations include AND operations, OR operations, and XOR operations, among others.

The interconnect circuitry 140 is connected to the instruction memory circuitry 130 and the operation circuitry 150. The interconnect circuitry 140 receives the interconnect control signal 132 from the instruction memory circuitry 130 and values from the data circuitry 170. The interconnect circuitry 140 routes values received from the data circuitry 170 to the different memory locations within the operation circuitry 150 based on the interconnect control signal 132.

The operation circuitry 150 includes the value memory circuits 152 and the evaluation circuits 154. The value memory circuits 152 are connected to the interconnect circuit 140 and the evaluation circuits 154. In one example, each value memory circuit 152 is connected to a respective evaluation circuit 154. In other examples, one or more of the value memory circuits 152 are connected to two or more of the evaluation circuits 154. Additionally, or alternatively, two or more of the value memory circuits 152 are connected to the same evaluation circuit 154. In one example, for each value memory circuit 152 there is a respective evaluation circuit 154. In other examples, there are other ratios of value memory circuits 152 to evaluation circuits 154.

The interconnect circuitry 140 includes multiplexers (MUXs) $142_1$-$142_D$, where D is an integer greater than 1. In one example, D is 192. In other examples, D is greater than 192 or less than 192. The MUXs 142 are connected to the value memory circuits 152 via a respective bus such that multiple bits can be communicated from the MUXs 142 to the value memory circuits 152. Each MUX 142 can communicate multiple bits to one or more of the value memory circuits 152 via a respective bus. Further, the MUXs 142 are connected to the data circuitry 170 via one or more buses such that one or more bits may be communicated from the data circuitry 170 to each MUX 142. In one example, each MUX 142 is connected to a respective one of the value memory circuits 152. In another example, two or more of the MUXs 142 are connected to a single value memory circuit 152. In one or more examples, at least one MUX 142 is connected to two value memory circuits 152. Each MUX 142 receives a control signal 132 and the output of each MUX 142 is controlled by one of the interconnect control signal 132. In one or more examples, the MUXs 142 receive two or more input signals (values) and output one or more output signals. In some examples, the MUXs 142 have a ratio of M input signals to P output signals. M and P are greater than one. Further, M is greater than P. The MUXs 142 are at least two bits wide such that the MUXs 142 are able to support four state values.

The value memory circuits 152 receive values from the interconnect circuitry 140 and output the values to the evaluation circuits 154 based on the read control signals $134_1$ and the write controls signals $134_2$. The value memory circuits 152 include value memory circuits $152_1$-$152_E$, where E is an integer greater than 1. In one example, E is 192. In other examples, E is greater than 192 or less than 192. In one example, the read controls signals $134_1$ are read commands and the write control signals $134_2$ are read commands. The value memory circuits 152 read values based on the read commands and write values based on the write commands. The read commands (e.g., the read control signals $134_1$) indicate which value or values a respective evaluation circuit 152 reads and consumes for an operation. The write commands (e.g., the write control signals $134_2$) indicate where value or values are written by the evaluation circuits 154. The value memory circuits 152 are multi-ported value storage memory devices. A multi-ported value storage memory devices are memory devices that have more than one port connected to the evaluation circuits 154. In one example, the value memory circuits 152 are value memory devices with greater than 2 ports. In one specific example, the value memory circuits are value memory devices with 4 ports. For example, the value memory circuits 152 are able to store multiple values and output multiple values over multiple different cycles. The value memory circuits 152 may store a value for multiple cycles and/or store different values for two or more cycles.

The value memory circuits 152 are at least two bits wide such that the value memory circuits 152 are able to support four state values. The value memory circuits 152 store values in one of four states (e.g., zero value state, one value state, unknown value state, and a tristate). Accordingly, the value memory circuits 152 are 4-state memory circuits.

The evaluation circuits 154 are connected to the value memory circuits 152 and the instruction memory circuitry 130. Each of the evaluation circuits 154 is connected to one or more of the value memory circuits 152 via one or more buses such that multiple bits can be communicated from the value memory circuits 152 to the evaluation circuits 154. The evaluation circuits 154 include evaluation circuits $154_1$-$154_F$, where F is an integer greater than 1. In one example, F is 192. In other examples, F is greater than 192 or less than 192. In one or more examples, each evaluation circuit 154 is connected to a respective value memory circuit 152. In another example, two or more evaluation circuits 154 are connected to the same value memory circuit 152 and/or an evaluation circuit 154 is connected to two or more value memory circuits 152. The evaluation circuits 154 receive the operator control signals 136 from the instruction memory circuitry 130. Further, the evaluation circuits 154 receive values from the value memory circuits 152 and perform an operation on the value. The operation is based on the received operator control signals 136. Each evaluation circuit 154 receives a different one of the operator control signals 136. In one example, each evaluation circuit 154 receives one or more values from the value memory circuits 152 and performs an operation based on the received operator control signals 136. Each evaluation circuit 154 outputs an output value based on the performed operation and the received values.

Two or more of the evaluation circuits 154 perform respective operations during at least partially overlapping periods. Accordingly, two or more of the evaluation circuits 154 perform respective operations in parallel with each other.

In one example, an evaluation circuit 154 may be configured during different cycles based on the received operator control signals 136. In one example, a first evaluation circuit 154 performs a first operation during a first cycle based on a first control signal 136 and a second operation during a second cycle based on a second control signal 136.

The evaluation circuits 154 are at least two bits wide such that the evaluation circuits 154 are able to perform operations on values having one of four states (e.g., zero value state, one value state, unknown value state, and a tristate). In one or more examples, the evaluation circuits 154 operate on values having one of four states values. Accordingly, evaluation circuits 154 are 4-state evaluation circuits. In one example, the evaluation circuits 154 receive values from the value memory circuits 152, where the values are four state values. The evaluation circuits 154 perform operations on the four state values. In one example, as will be described in greater detail in the following, the evaluations circuits 154 perform operations based on a received an X value (e.g., unknown value state) and determine whether or not the unknown value state propagates through to an output signal, or if the output signal has a different value (e.g., a logic value of 0 or a logic value of 1).

The evaluation circuits 154 may be grouped into wide operators to receive multi-bit inputs and perform operations on the multi-bit inputs. Wide operators include two or more evaluation circuits 154. In one example, two evaluation circuits 154 may be grouped into a dual operator. For example, two evaluation circuits 154 may be configured to perform together to perform a function having eight inputs and two output. In other examples, other numbers of the evaluation circuits 154 are grouped to perform functions having more than 8 inputs and more than 2 outputs. For example, each of the evaluation circuit 154 can perform a function having four inputs and one output. Accordingly, "U" evaluation circuits 154 may be grouped to perform a function having 4*U inputs and U outputs. The grouped evaluation circuits 154 may be grouped in any order. In one or more examples, the evaluation circuits 154 are grouped based on the operations of the DUV. For example, the DUV may include a combination of wide operators that compute results from multi-bit inputs and scalar operators that compute results from single-bit inputs.

In one or more examples, the evaluation circuit 120 further includes force memory circuitry 160. The force memory circuitry 160 is connected to the output of the operation circuitry 150. The force memory circuitry 160 includes MUXs $162_1$-$162_G$ where G is an integer greater than 1. In one example, G is 192. In other examples, G is greater than 192 or less than 192. The force memory circuitry 160 receives the force memory control signals 138. Further, the force memory circuitry 160 receives forced values 139. The force memory circuitry 160 connects the outputs of the evaluation circuits 154 to a communication path 174. The force memory circuitry 160 is configured to output a value received from the evaluation circuits 154 or a forced value 139 based on the force memory control signals 138. In one example, the force memory circuits 162 includes MUXs. Each MUX is connected to a respective one of the evaluation circuits 154. Further, each MUX receives a force value. The forced values 139 may be received from the instruction memory circuitry 130 or another element within the evaluation circuit 120. The forced values 139 may be referred to as a predetermined value and may be used to set an output of a specific evaluation circuit 154 to the predetermined value. In one example, the force memory circuit $162_1$ outputs a value received from the evaluation circuit $154_1$ or a forced value 139 based on the control signal 138. For example, based on a control signal 138 having a first value the force memory circuit $162_1$ outputs the value received from the evaluation circuit $154_1$, and based on the control signal 138 having a second value, the force memory circuit $162_1$ outputs the forced value 139. In one example, the testing device provides a forced value 139 to set a value of an operation a predetermined value (e.g., the forced value 139) based on a testing scenario or behavior of the circuit design.

In one example, the number of MUXs 142, the number of value memory circuits 152, the number of evaluation circuits 154, and the number of force memory circuits 162 are equal to each other. In another example, at least one of the number of MUXs 142, the number of value memory circuits 152, the number of evaluation circuits 154, and the number of force memory circuits 162 is greater than another at least one of the of the number of MUXs 142, the number of value memory circuits 152, the number of evaluation circuits 154, and the number of force memory circuits 162.

The communication path 174 connects the output of the evaluation circuit 120 to the data circuitry 170 and/or the trace circuitry 172. The communication path 174 may be a communication bus. The width of the communication bus is equal to the number of evaluation circuits 154. In one example, the communication path 174 includes multiple traces that connect the data circuitry 170 and/or the trace circuitry 172 with the force memory circuitry 160. In one example, the communication path 174 functions as a feedback path, communicating values determined by the evaluation circuits 154 to the data circuitry 170.

The trace circuitry 172 accumulates changes to observed portions (e.g., nets) of the DUV. The accumulated changes are determined based on the values the force memory circuitry 160 and the communication path 174. The values may be output values of the operation circuitry 150 or a forced value. In one example, the trace circuitry 172 is connected to the testing device 180 and communicates the accumulated changes to the testing device 180 for further processing (e.g., to detect errors and/or other processes). In one or more examples, trace circuitry 172 provides a mechanism to capture data generated from a DUV. The trace circuitry 172 detects which output bits of the force memory circuitry 160 have changed from the previous cycle. The trace circuitry 172 saves the data in a memory device external to the simulation vector processor system 100. In one or more examples, while simulating a circuit design via the vector processor system 100, or when the external memory device is determined to be full, the testing device 180 reads the data from the external memory device. The testing device 180 then converts the data into a viewable file (e.g., a file that can be output on a display device).

The data circuitry 170 includes a combination of circuit elements for receiving values from the operation circuitry 150 via the communication path 174 and/or values from the testing device 180. In one example, the data circuitry 170 outputs the values to the interconnect circuitry 140. Further, the data circuitry 170 includes a combination of circuit elements for outputting values to the interconnect circuitry 140. In one example, the data circuitry 170 multiplexes the data between flow processor 110, the verification interface 112, and/or the testing device 180 with data being generated from the evaluation circuits 154.

In one example, the data circuitry 170 and the trace circuitry 172 are connected to a verification interface 112 of the simulation vector processor system 100. The verification interface 112 includes an input/output (I/O) buffer that is configured to store the accumulated changes received from the trace circuitry 172 and/or values to be input to the data circuitry 170. In one or more examples, the verification interface 112 provides a mechanism for the testing device 180 to send and receive data from the simulation vector processor system 100. In one example, the verification interface 112 has two buffers. A first buffer for receiving input from the testing device 180 and a second buffer for receiving outputs generated by the simulation vector processor system 100. In one or more examples, the verification interface 112 provides status bits to indicate to the testing device 180 if and when there is data available in the output buffer.

In one example, the values that are changed during the operations performed by the evaluation circuit 120 are stored within the I/O buffer of the verification interface by the trace circuitry 172. The data output to the I/O buffer is represented as value changes. The value changes correspond to events on the output values that are to be read by a testing device 180. In one example, outputting changes in the values reduces the amount of data that is communicated, reducing the input/output time. In one example, the verification interface 112 is connected to the flow processor 110 and outputs control signals to control registers within the flow processor 110. The control signals trigger the evaluation of a DUV.

In one example, the verification interface 112 enables debug, design intent checking, and verification intent checking, among others. The verification interface 112 may generate traces of value changes of variables of the DUV. In one example, the verification interface 112 generates assertions of operations that fail. In one example, an assertion of an operation that fails is an operation for which a condition is not met. Further, the verification interface 112 generates coverage assertion data based on the values output by the evaluation circuit 120.

In one example, the verification interface 112 provides an interface for the testing device 180 to communicate force values to the evaluation circuit 120. Force values may be written into the instruction memory circuitry 130 to be written to the force memory circuitry 160. The force values may be written into locations within the instruction memory circuitry 130 corresponding to the respective force memory circuitry 160. The instruction memory circuitry 130 outputs the force values along with respective force memory control signals 138.

Further, the verification interface 112 provides a location of the values in the model of the DUV. In one example, the verification interface 112 allows for changes to be made to the DUV without recompiling the corresponding model of the DUV.

In one or more examples, the simulation vector processor system 100 verifies the functional correctness and intent (e.g., design intent, power intent) of a DUV. The simulation vector processor system 100 verifies the functional correctness using values to simulate the functions of a DUV, checking the outputs of the DUV for unexpected values. The unexpected values indicate errors within the DUV. Functional correctness includes checking that DUV's internal variables reach an expected value based on the application of a reset input sequence. In example, the expected values of the variables of a DUV after a reset process are zero values. Detecting that the values of the variables of the DUV deviate from zero may be used to indicate that the corresponding DUV does not function correctly. Detecting that the values of the variables of the DUV have a zero value indicates that the DUV is free from errors and has correct functionality.

The simulation vector processor system 100 checks for design intent by specifying the expected sequence of behavior using hardware description languages, and checking that a DUV operates correctly when parts of the DUV are disabled to save power and then re-enabled. The power intent is specified in low power specifications (e.g., a Unified Power Format or other power format specification for low power techniques) that are part of the DUV.

In one example, a DUV is modeled at the register transfer level (RTL) and gate level. In other examples, other modeling techniques may be used to model the DUV. RTL models includes a collection of parallel programs called processes. Each process evaluates when a defined input value (or variable) changes. Each process generates output values from the inputs using a statement such as for loops, branching code, case, assignments (or writes) to variables by expressions. Expressions may be logical expressions (e.g., AND expressions, OR expressions, and XOR expressions, among others) and arithmetic expressions (e.g., add expressions, multiply expressions, and shift expressions, among others). Processes interact by reading values written by other processes that model other portions of the DUV. In one example, the processes are executed as operations by the evaluation circuits 154. Gate level models are special processes that perform one function. For example, gate level models perform logic functions (e.g., AND functions, OR function, and XOR functions, among others). The functions may be executed as operations by the evaluation circuits 154.

To verify the function correction of the design intent, the DUV is modeled with four states (4-states) for each bit of a value. As is described in greater detail in the following, each value is represented by two signals. The bits of the signals are decoded to determine the state of the value.

In a four state model, all DUV variables are set to the X value (e.g., the unknown value). The X value represents the possibility that the variable could have a value of 0 or a value of 1, and the current value of the variable is unknown. In one example, based on the occurrence of a reset process, a variable having an X value of a correctly functioning DUV is updated to having a zero or one value. However, in a DUV having one or more errors, a variable having an X value maintains the X value after the reset value. A variable maintaining an X value may be indicative of a DUV that does not properly reset based on a power signal being enabled. The X value may be detected by the simulation vector processor system 100 to detect errors within the DUV.

In one or more examples, the simulation vector processor system 100 verifies that a DUV functions correctly in a four state model by setting all variables in a power disabled region of the DUV to the X value. When power is enabled for the region, the variables are observed by performing operations by the evaluation circuits 154 of the simulation vector processor system 100. Based on the variables remaining as an X value, a determination that the DUV has one or more errors is made. Based on the variables switching to a 0 value or 1 value, a determination that the DUV is correctly functioning is made.

The simulation vector processor system 100 evaluates a DUV that includes four state operators. In such an example, the simulation vector processor system 100 merges two or more resulting values determined from the four state operators. For example, in an if-else statement operation, a two-state evaluation process is used to evaluate the if-else statement operation. In one example, the inputs to the if-else statement is a, b, c, and d. The evaluation circuits 154 perform of the simulation vector processor system 100 perform an add operation to determine a+b if the enable signal is a logic value of 1, and c+d if the enable signal has a logic value of 0. In a four state evaluation, when the enable signal can have a logic value of 0, 1, or X, both a+b and c+d are evaluated, and the results are merged. Merging the two results includes merging the bits of the corresponding signals bit by bit. In one example, the value memory circuits 152 and the evaluation circuits 154 are used to merge the bits of the two results. The bits of the two results may be merged bit by bit and based on the values of the bits. For example, if both bits have a value of 0, the value of the corresponding bit of the merged signal is 0, if the value of both bots is 1, the value of the corresponding bit of the merged signal is 1, if the value of the bits differ from each other, the value of the corresponding bit of the merged signal is an unknown value.

The output values of different operations are communicated from the value memory circuits 152 via the communication path 174, the data circuitry 170, and the interconnect circuitry 140. The output values are provided to one or more of the evaluation circuits 154 to be merged bit by bit. In one example, if bit 0 of both signals have value of 0, then the value of the corresponding bit of the output signal is 0. Further, if bit 1 of both signals have a value of 1, the value of the corresponding bit of the output signal is 1. If bit 2 of both signals have a different value, bit 2 of the output signal is an unknown value. In other examples, other conditional statements may be used for four state evaluation.

The simulation vector processor system 100 implements X (unknown value) propagation. X propagation includes evaluating branches of conditional operators (e.g., if-else operators, case operators, the ternary operator) if the condition of a branch is logic value of 1. If the condition is an X value (e.g., unknown value), all possible values that can be assigned when the condition is a logic value of 0 and when the condition is a logic value of 1 will be merged to produce the result. In one example, one or more evaluation circuits 154 receives an X value from a corresponding value memory circuit 152, performs a corresponding operation on the X value, and generates an output value. The output value may have an X value and is propagated through the DUV.

Further, implementing X propagation includes evaluating test operators (e.g., less than operators, greater than operators, and logical equality operators, among others) to produce a result to 0 or 1 value when all inputs have a 0 or 1 value. If any input value has X value in any bit, the output value will be the X value. In one example, the test operations are performed by one or more evaluation circuits 154.

In a four state test operator (e.g., case equality), X propagation includes comparing 4-state values bit by bit. If two corresponding bits have an X value, the output signal has an X value, or a Z value, the output signal has a Z value. One or more value memory circuits 152 and evaluation circuits 154 may be used to compare the values bit by bit to determine if the bits of the output have an X value or another value.

For arithmetic operators (e.g., addition operators, subtraction operators, multiplication operators, division multiplication, and exponent operators, among others), X propagation includes evaluating operation, if any input bit has an X value the result has an X value. In one example, the arithmetic operations are performed by one or more value memory circuits 152 and evaluation circuits 154.

X propagation in memory includes writing a value as an X value or a first address, writing the 4-state value to the first memory and reading out the 4-state value when the first is read. The value memory circuits 152 read and write X values. In one example, if the write address is the X value, then a value is not written as the design assertion can be used to catch the bad write, and the entire memory is set to the X Value. If the read address is an X value, the read out value is the X value.

In one or more examples, to increase parallelism and capacity, multiple simulation vector processor systems 100 are interconnected efficiently. The simulation vector processor systems 100 may include instructions for communicating between multiple interconnected simulation vector processor systems 100. For example, the simulation vector processor system 100 reads a set of values from a neighbor simulation vector processor system and utilize the values as input values for instructions to one or more evaluation circuits 154. In such an example, the evaluation circuits 154 wait to perform the corresponding operations until values from the simulation vector processor systems are available. In one example, the values are communicated via a blocking receive instruction. The simulation vector processor system 100 has a non-blocking send instruction that takes outputs of an evaluation circuit 154 and sends the output to another simulation vector processor system.

In one or more examples, a DUV can be split into sub-circuit graphs, each of which is assigned to a different simulation vector processor system 100. The values that go between sub-circuit graphs are sent through non-blocking send instructions and blocking receive instructions. In one example, multiple different simulation vector processor systems 100 may perform operations corresponding the same sub-circuit graph.

DUV evaluation spread over multiple simulation vector processor systems 100 uses synchronization. For example, synchronization instructions are communicated between simulation vector processor systems 100 to indicate that the simulation vector processor systems 100 have completed the current phase of work.

Each sub-circuit graph can be compiled in parallel reducing the overall compilation time. Assignment of sub-circuit graph to a simulation vector processor system by actual processor (system) identifier (ID) can be done by initially assigning an identified simulation vector processor system to a sub-circuit graph. Alternatively, the assignment can be to a symbolic simulation vector processor system ID. The symbolic simulation vector processor system identifier can be assigned to an actual simulation vector processor system in a later performed relocation (or assignment) step.

Figure 2:
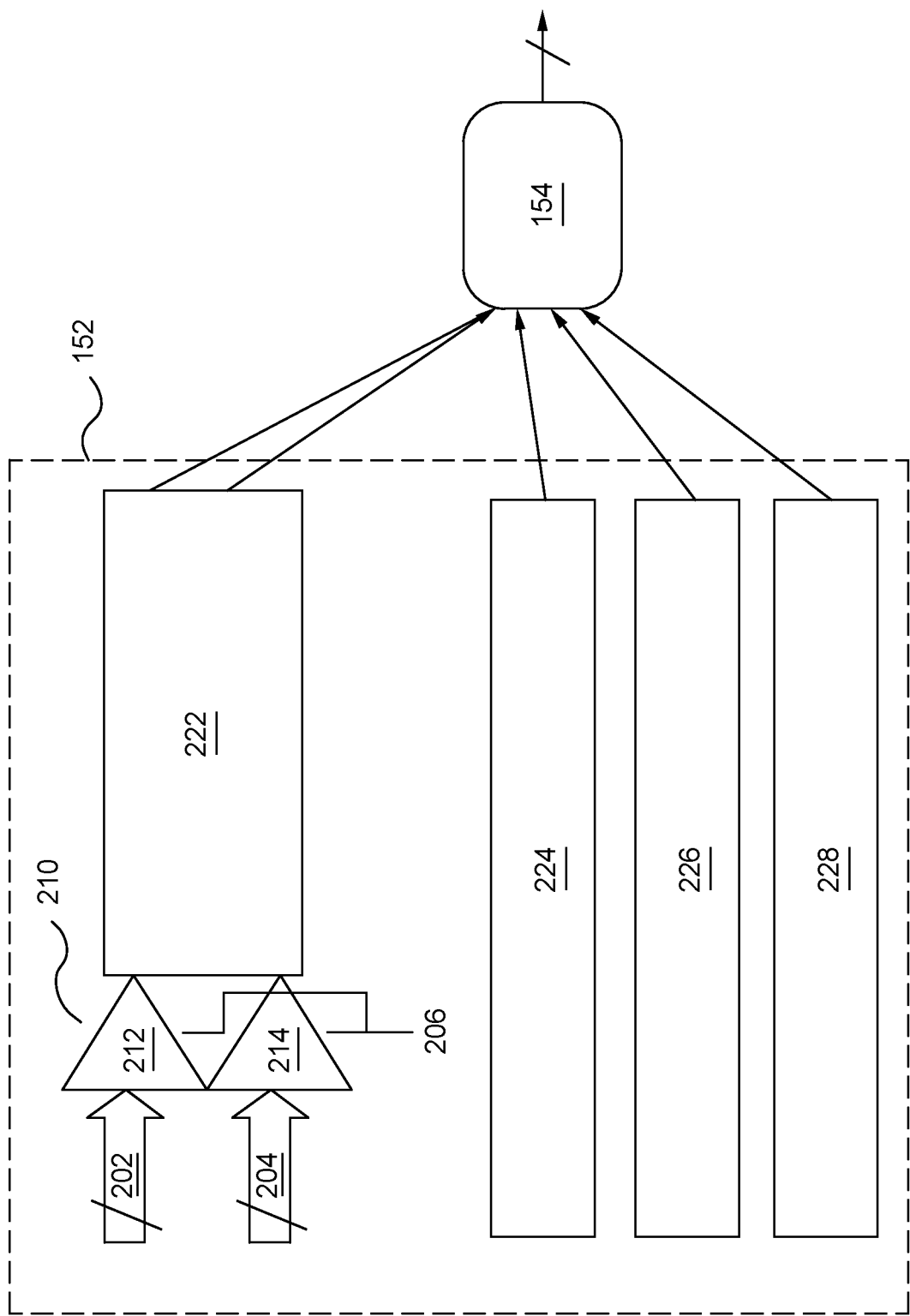
FIG. 2 illustrates a block diagram of a portion of a simulation vector processor system, according to one embodiment of the present disclosure.

FIG. 2 illustrates an example configuration of a value memory circuit 152 and an evaluation circuit 154. The value memory circuit 152 includes state identification circuit 210 and value memories 222-228. The state identification circuit 210 is connected to the value memory 222. While a single state identification circuit 210 is illustrated in FIG. 2, in other examples, a respective state identification circuit 210 is connected to each value memory 224-228. The state identification circuit 210 determines the state of a received value. Each value is represented by two signals (four bits). The two signals encode the four states of the value. The four states include a state of zero (0), a state of one (1), an unknown state (X), and a tristate (Z). In one example, the state identification circuit 210 includes MUX 212 and MUX 214. The MUX 212 and the MUX 214 are H input to 1 output MUXs, where H is greater than 1. The MUX 212 and the MUX 214 receive a select signal 206. The MUX 212 and the MUX 214 receive the signals 202 and 204, respectively. The MUX 212 and the MUX 214 select and output bits of the signals 202 and 204 based on the select signal 206.

Each of the signals 202 and 204 includes J bits. J is one or more. Based on a comparison of the bits of the signals 202 and 204, the state of the corresponding value is determined. In one example, based on a bit of the signal 202 and a bit of the signal 204 both having a value of zero, the state of the value is a logic zero. Based on a bit of the signal 202 having a value of zero, and a bit of the signal 204 having a value of one, the state of the value is a logic one. Based on a bit of the signal 202 having a value of one, and a bit of the signal 204 having a value of zero, the state of the value is tristate. Further, based on a bit of the signal 202 having a value of one, and a state of the signal 204 having a value of one, the state of the value is an unknown state. It is appreciated that the state identification circuit 210 may determine a state of the value based on different combinations of comparisons of the bits of the signals 202 and 204, without deviating from the scope of the present disclosure.

The value memory 222, 224, 226, and 228 stores values provided by the interconnect circuitry 140. Each of the value memories 222, 224, 226, and 228 has a size of K×8 bits. K is one or more. While four value memories are shown in FIG. 2, in other examples, the value memory circuit 152 includes more than or less than four value memories.

The value memories 222-228 are connected to the evaluation circuit 154. The evaluation circuit 154 is a four state and four input evaluation circuit. Further, the evaluation circuit 154 has a single output (e.g., a one output evaluation circuit). The evaluation circuit 154 receives four input values, where each input value is a four state input value. The evaluation circuit 154 performs an operation on the input values based on a control signal 136 received from the instruction memory circuitry 130 and generates an output value. In other examples, the evaluation circuit 154 may be more than or less than a four input evaluation circuit. Additionally, or alternatively, the evaluation circuit 154 may have more than one output.

Figure 3:
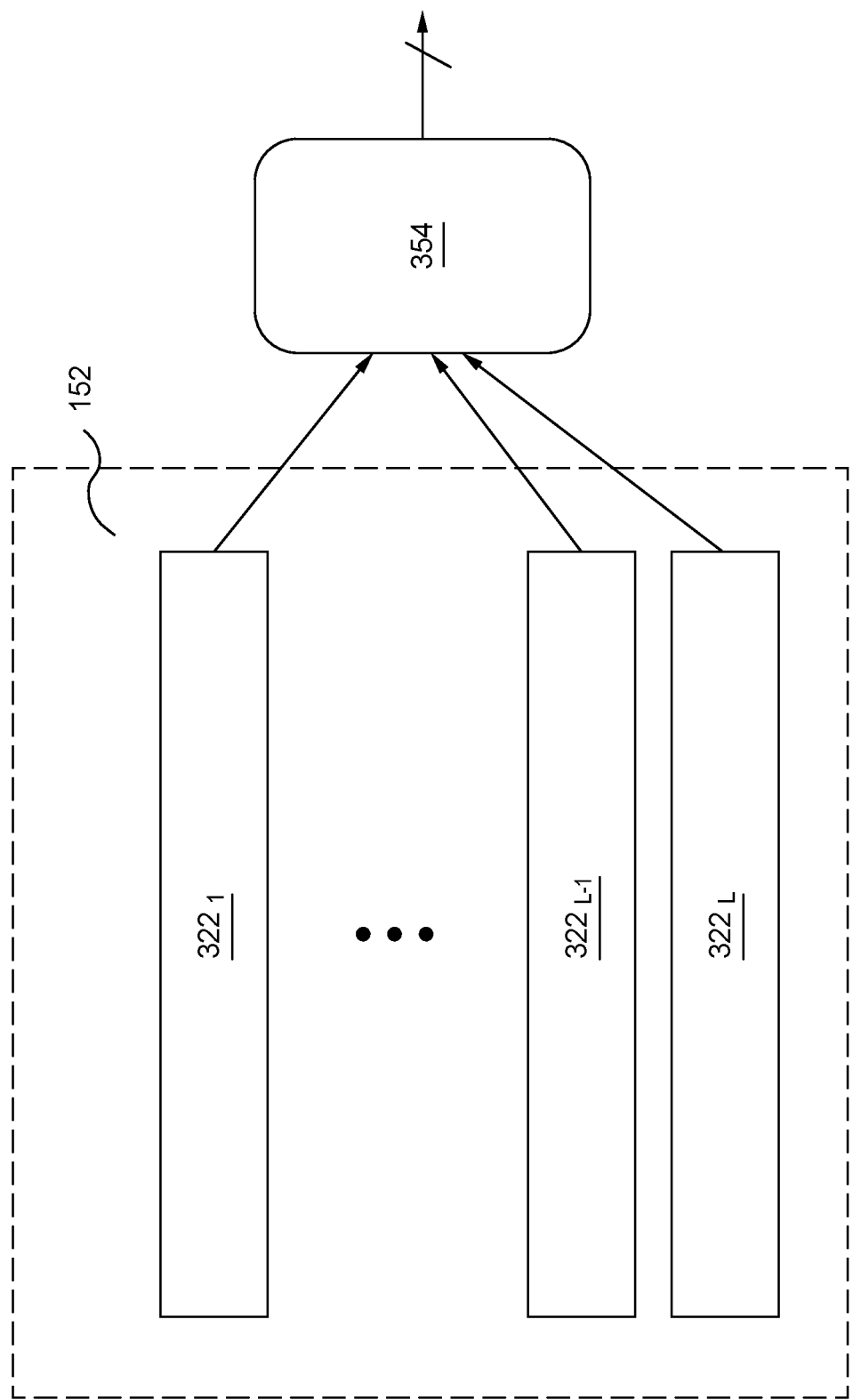
FIG. 3 illustrates a block diagram of another portion of a simulation vector processor system, according to one embodiment of the present disclosure.

FIG. 3 illustrates a value memory circuit 152 and an operator 354, according to an embodiment of the present disclosure. The value memory circuit 152 includes value memories 3221-322L. L is greater than one. In one example, L is 32. In such an example, the value memory circuit 152 includes 32 value memories. While not illustrated, the value memory circuit 152 includes one or more state identification circuits 210 connected to the value memories 322.

The value memories 322 stores values provided by the interconnect circuitry 140. Each of the value memories 322 has a size of P8 bits. P is one or more.

While the value memories 322 are illustrated as being part of the same value memory circuit 152, in other examples, the value memories 322 may be part of two or more value memory circuits 152. In one example, each value memory 322 is part of a different value memory circuit 152.

The value memories 322 are connected to the operator 354. The operator 354 includes one or more of the evaluation circuits 154. In one example, the operator 354 is a wide operator and includes more than one evaluation circuit 154. In one or more examples, a wide operator includes more than two evaluation circuits 154. In one specific example, the operator 354 includes 32 evaluation circuits 154. The operator 354 is a four state and 32 input operator. Further, the operator 354 is an eight output operator. Accordingly, the operator 354 receives 32 input values from the value memories 322, where each input value is a four state input value. The operator 354 performs an operation on the input values based on a control signal 136 received from the instruction memory circuitry 130 and generates eight output values.

Figure 4:
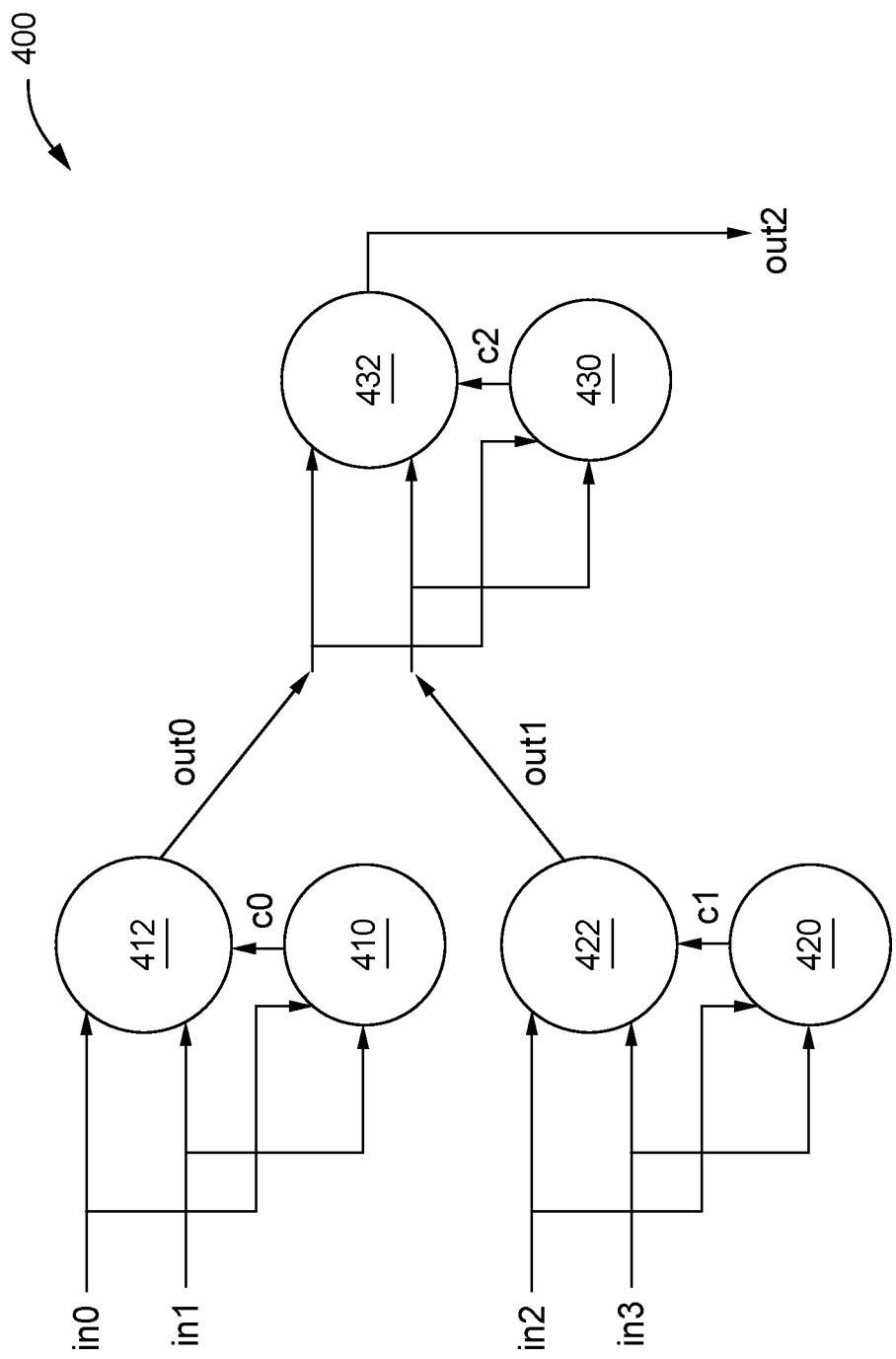
FIG. 4 illustrates a circuit graph, according to one embodiment of the present disclosure.

FIG. 4 illustrates an example circuit graph 400, according to an embodiment of the present disclosure. The circuit graph 400 includes multiple levels. The operations of each of the levels may be evaluated in parallel by the simulation vector processor system 100. The circuit graph 400 includes operations 410, 412, 420, 422, 430, and 432. The operations 410, 420, and 430 are "greater than" operations. A greater than operation outputs a logic value 0 based on a first input signal being greater than a second input signal and a logic value 1 based on the first input signal being less than the second input signal. The operations 412, 422, and 432 are if-else operations. An if-else operation is a conditional operation. In one example, an if-else operation outputs a first output signal based on a first conditional statement being true and a second output signal, different than the first, based on the first conditional statement not being true. The operations 410 and 412 receive the input signals in0 and in1. An output signal c0 of the operation 410 is communicated to the operation 412. The output signal out0 of the operation 412 is communicated to the operations 430 and 432. The operations 420 and 422 receive the input signals in2 and in3. An output signal c1 of the operation 420 is communicated to the operation 422. The output signal out1 of the operation 422 is communicated to the operations 430 and 432.

The operation 430 receives the output signal out0 and the output signal out1, and generates the output signal c2. The output signal c2 is communicated to the operation 432. The operation 432 receives the output signal out0, the output signal out1, and the output signal c2, and generates the output signal out2.

The operations 410, 412, 420, 422, 430, and 432 correspond to different levels. The levels correspond to the operations that are performed during different clock cycles of an evaluation clock signal. In one example, the operations are performed based on the availability of the signals that an operation receives as an input. In one example, the operations 410 and 420 are assigned to Level 0. Level 0 is the base or first level. Both of the operations 410 and 420 perform corresponding operations based on the input signals in0, in1, in2, and in3, respectively. The operations 412 and 422 are assigned to Level 1. The operations 412 and 422 rely on signals received from the operations 410 and 420, accordingly the operations 412 and 422 are assigned to a level at least one higher than the level assigned to the operations 410 and 420. The operation 430 is assigned to Level 2. The operation 430 receives output signals out0 and out1 from the operations 412 and 422, respectively. Accordingly, the operation 430 is assigned to a level that is at least one higher than the operations 412 and 422. The operation 432 is assigned to Level 3.

The operations of each corresponding level may be performed in parallel (during at least partially overlapping periods) by the simulation vector processor system 100. For example, with reference to level 0, the operations 410 and 420 are performed in parallel. Further, the operations 412 and 422 of level 1 are performed in parallel by the simulation vector processor system 100.

Figure 5:
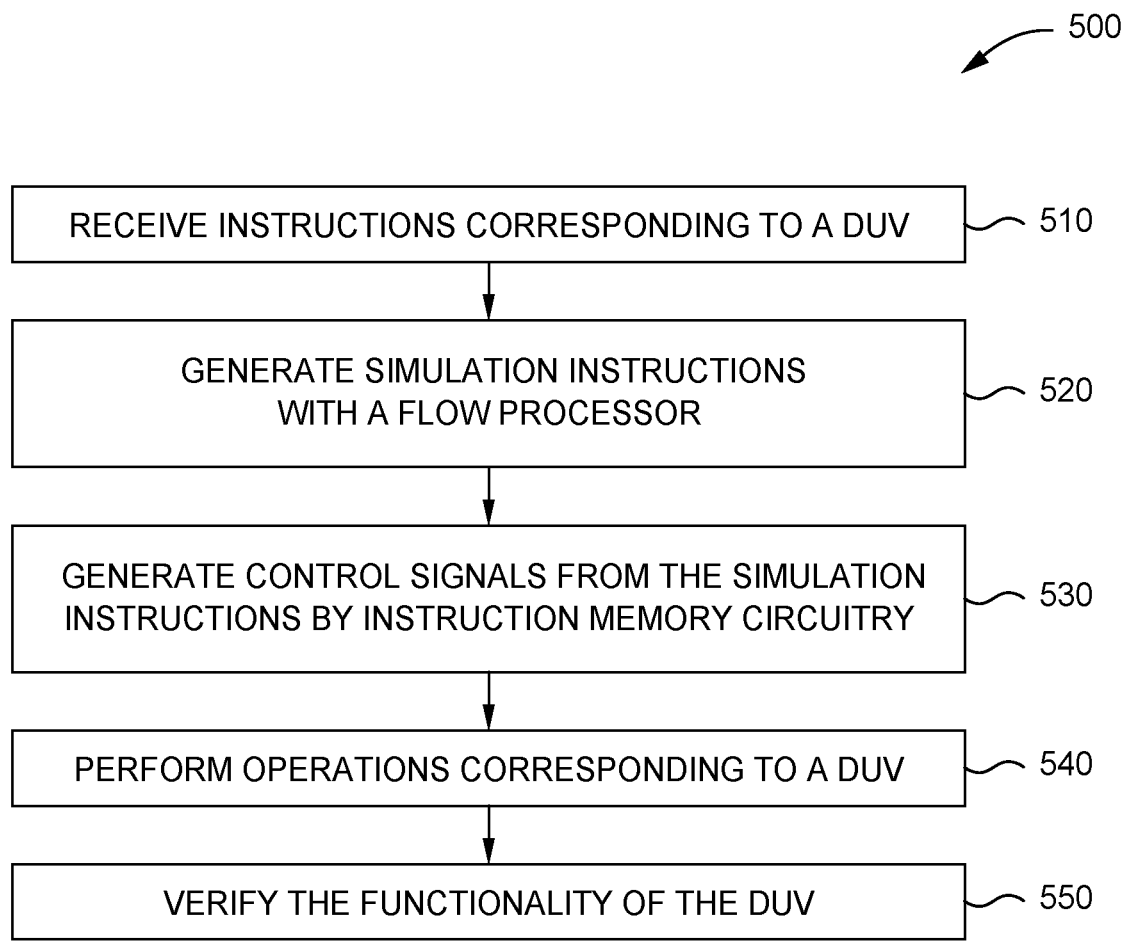
FIG. 5 illustrates a flowchart of a method for verifying functionality of a circuit design, according to one embodiment of the present disclosure.

FIG. 5 illustrates a flowchart of a method 500 for verifying a circuit design, according to an embodiment of the disclosure. The method 500 is performed by the simulation vector processor system 100 of FIG. 1. In one example, the method 500 is executed by a processor (e.g., the processing device 1002 of FIG. 10) as instructions (e.g., instructions 1026 of FIG. 10) stored in a memory (e.g., the main memory 1004 or the machine-readable medium 1024 of FIG. 10).

At 510 of method 500, instructions corresponding to a DUV are received at the simulation vector processor system 100. In one example, the testing device 180 generates the instructions for the circuit simulation system 100 from the DUV. The instructions are received by the flow processor 110. The testing device 180 includes a compiler that receives the DUV and generates the instructions from the DUV. The instructions represent the DUV as parallel operators that form vector instructions, and groups of the parallel operators form the instructions (e.g., vector instructions).

At 520 of method 500, simulation instructions are generated by the flow processor. The simulation instructions are generated by the flow processor 110 based on the instructions received from the testing device 180. In one example, the received instructions include one or more clock signals. The flow processor 110 includes edge detectors that detect an edge of the clock signal or signals. In one example, the edge detectors of the flow processor 110 detect a positive edge and/or a negative edge. Based on the detected edge, the flow processor 110 identifies a portion of the DUV for verification based on the clock signal having the detected edge.

In one example, a DUV includes multiple clock signals. During one period, a subset of the clock signals is active. Accordingly, detecting the edges of the clock signals detects the active clock signal or clock signals. The edge detectors of the flow processor 110 detect different types of variable changes. For example, the edge detectors detect signal variable edges. A positive edge is a change from a value of 0 (e.g., a low voltage level) to a value of 1 (e.g., a high voltage level) or a value of X (e.g., an unknown value). A positive edge may further correspond to a change from a value of X to a value of 1. A negative edge is a change from a value of 1 to a value of 0 or a value of X. In one example, the type of edge that is detected is selectable based on the corresponding model.

In one example, a group of variables to be evaluated correspond to a type of the detected edge (e.g., positive edge or negative edge). Further, the sequence of instructions for verification corresponds to at least a detected edge.

The flow processor 110 generates instructions based on the clock signal or signals having the detected edge. The instructions include operations and corresponding variables for the verification process. The operations are four state operations and the variables are four state variables.

In one example, with reference to FIG. 4, the circuit graph 400 is selected based on the detected edge. Instructions corresponding to the circuit graph 400 are generated and communicated to the instruction memory circuitry 130.

At 530 of the method 500, control signals are generated based on the simulation instructions. For example, with reference to FIG. 1, the instruction memory circuitry 130 generates the control signals 132, 134, 136, and 138 from the simulation instructions. In one example, the instruction memory circuitry 130 identifies which operations and variables are verified and during which cycles the operations occur and variables are available. With reference to FIG. 4, the instruction memory circuitry 130 identifies that operations 410 and 420 are performed during a first cycle of a clock signal (e.g., a part of a first level). Further, the operations 410 and 420 are determined to occur during the same cycle. The instruction memory circuitry 130 further determines that the values operated on during the first cycle are input signals in0, in1, in2, and in3.

The instruction memory circuitry 130 determines that the operations 412 and 422 are to be performed a number of cycles after the operations 410 and 420 based on the simulation instructions. Accordingly, the instruction memory circuitry 130 generates corresponding control signals 132, 134, and 136 to control the interconnection circuitry 140, the value memory circuit 152, and the evaluation circuits 154. The operations 412 and 422 are determined to occur during the same cycle. In one example, the operations 412 and 422 are performed one or more cycles after the operations 410 and 420 and are part of a second level. Further, the values operated on by the operations 412 and 422 are determined to be input signals in0, in1, in2, in3, and the output values c0 and c1 of the operations 410 and 420.

The instruction memory circuitry 130 determines that the operation 430 occurs a number of cycles after the operations 412 and 422 and as part of a third level. Accordingly, the instruction memory circuitry 130 generates corresponding control signals 132, 134, and 136 to control the interconnection circuitry 140, the value memory circuit 152, and the evaluation circuits 154. In one example, the operation 430 is determined to occur one or more cycles after the operations 412 and 422. The instruction memory circuitry 130 determines that the operation 432 is determined to occur a number of cycles after the operation 430 and as part of a fourth level. Accordingly, the instruction memory circuitry 130 generates corresponding control signals 132, 134, and 136 to control the interconnection circuitry 140, the value memory circuit 152, and the evaluation circuits 154. For example, the operation 432 is determined to occur one or more cycles after the operation 430.

The instruction memory circuitry 130 further determines that the values operated on during the first cycle are input signals in0 and in1. In one example, the cycles correspond to clock cycles of the simulation vector processor system 100. The instruction memory circuitry 130 generates additional instructions for each level of the circuit graph 400 of FIG. 4.

The instruction memory circuitry 130 generates the control signals 132, 134, 136, and/or 138 based on the identified operations, active cycles, and variables that are determined to correspond to each cycle (e.g., each level). For example, the instruction memory circuitry 130 outputs the first interconnect control signal 132 to instruct the interconnect circuitry 140 to route the input signals in0, in1, in2, and in3 to the value memory circuits 152$_1$ and 152$_2$ during a first cycle. The instruction memory circuitry 130 generates the read control signals 134$_1$ and write control signals 134$_2$ that indicate to the value memory circuits 152$_1$ and 152$_2$ which address to write values and from which addresses to read values. For example, the write controls signal 134$_2$ are generated to indicate to the value memory storage circuit 152$_1$ and 152$_2$ an address location to write data and the read control signals 134$_1$ are generated to indicate to the value memory circuits 152$_1$ and 152$_2$ an address location to read data from.

In one example, the instruction memory circuitry 130 generates the operator control signals 136 to configure to the evaluation circuits 154$_1$ and 154$_2$ to perform an operation during the first cycle. For example, with reference to level 1 of the circuit graph 400 of FIG. 4, the control signals 136 are generated to configure the evaluation circuits 154$_1$ and 154$_2$ as greater than operators.

The instruction memory circuitry 130 further generates control signals corresponding to the second level of the circuit graph 400 from the simulation instructions. The second level corresponds to a second cycle. During the second cycle, the instruction memory circuitry 130 generates interconnect control signal 132 indicating to the interconnect circuitry 140 where to route input signals in0, in1, in2, in3, and signals c0 and c1. For example, the instruction memory circuitry 130 generates the interconnect control signal 132 to instruct the interconnect circuitry 140 to route the input signal in0, in1, in2, in3, and signals c0 and c1 to the value memory circuits 152 that are coupled to the evaluation circuits 154 that perform the corresponding operations. The instruction memory circuitry 130 further generates read control signals 134$_1$ and write control signals 134$_2$ to instruct the value memory circuits 152 which addresses to read and which addresses to write data. The instruction memory circuitry 130 further generates operator control signals 136 to instruct the evaluation circuits 154 to perform the identified operations.

The instruction memory circuitry 130 further generates control signals corresponding to the third level of the circuit graph 400 from the simulation instructions. The third level corresponds to a third cycle. During the third cycle, the instruction memory circuitry 130 generates interconnect control signal 132 indicating to the interconnect circuitry 140 where to route the signals out0 and out1. For example, the instruction memory circuitry 130 generates the interconnect control signal 132 to instruct the interconnect circuitry 140 to route the signals out0 and out1 to the value memory circuits 152 that are coupled to the evaluation circuits 154 performing the corresponding operations. The instruction memory circuitry 130 further generates the read control signals 134$_1$ and the write controls signals 134$_2$ to instruct the value memory circuits 152 which addresses to read and which addresses to write data. The instruction memory circuitry 130 further generates operator control signals 136 to instruct the evaluation circuits 154 to perform the identified operations of the third cycle.

The instruction memory circuitry 130 further generates control signals corresponding to the fourth level of the circuit graph 400 from the simulation instructions. The fourth level corresponds to a fourth cycle. During the fourth cycle, the instruction memory circuitry 130 generates interconnect control signal 132 indicating to the interconnect circuitry 140 where to route the signals out0 and out1, and the signal c2. For example, the instruction memory circuitry 130 generates the interconnect control signal 132 to instruct the interconnect circuitry 140 to route the signals out0 and out1, and the signal c2 to the value memory circuits 152 that are coupled to the evaluation circuits 154 performing the corresponding operations. The instruction memory circuitry 130 further generates the read control signals 134$_1$ and the write control signals 134$_2$ to instruct the value memory circuitries 152 which addresses to read and which addresses to write data. The instruction memory circuitry 130 further generates operator control signals 136 to instruct the evaluation circuits 154 to perform the identified operations of the fourth cycle.

At 540 of the method 500, operations are performed to verify the functionality of the DUV. With reference to FIG. 1, the evaluation circuits 154 perform the operations based on the operator control signals 136. The evaluation circuits 154 perform the operations based on the cycles during which the operator control signals 136 are received. The evaluation circuits 154 receive values from the corresponding value memory circuits 152, perform operations based on the control signal 136, and generate operation (e.g., output) values. The operation values are output to the communication path 174.

With reference to FIG. 1 and FIG. 4, the evaluation circuits 154$_1$ and 154$_2$, during a first cycle, receive corresponding operator control signals 136 from the instruction memory circuitry 130. The evaluation circuits 154$_1$ and 154$_2$ perform operations based on the received operator control signals 136. For example, the evaluation circuits 154$_1$ and 154$_2$ perform greater than operations. The evaluation circuit 154$_1$ receives the input signals in0 and the input signal in1 from the value memory circuit 152$_1$, performs the "greater than" operation, and outputs the output signal c0. The evaluation circuit 154$_2$ receives the input signals in2 and the input signal in3 from the value memory circuit 152$_2$ and performs the greater than operation and outputs the output signal c1. The output signals c0 and c1 are output to the communication path 174, which communicates the values c0 and c1 to the data circuitry 170. The data circuitry 170 communicates the values c0 and c1 to the value memory circuit 152 via the interconnect circuitry 140 based on the interconnect control signal 132. For example, the interconnect circuitry 140 routes the signal out0 to the value memory circuit 152$_5$ and the signal out1 to the value memory circuit 152$_6$ via the interconnect control signal 132.

During a second cycle (e.g., a second period), the evaluation circuits 154$_3$ and 154$_4$ receive corresponding operator control signals 136 from the instruction memory circuitry 130. The evaluation circuits 154$_3$ and 154$_5$ perform operations based on the received operator control signals 136. For example, the evaluation circuits 154$_3$ and 154$_4$ perform if-else operations. The evaluation circuit 154$_1$ receives the input signals in0, the input signal in1, and the signal c0 from the value memory circuit 152$_3$ and performs the if-else operation and outputs the signal out0. The evaluation circuit 154$_2$ receives the input signals in2, the input signal in3, and the signal c1 from the value memory circuit 152$_4$, performs the if-else operation and outputs the signal out1. The signals out0 and out1 are output to the communication path 174, which communicates the signals out0 and out1 to the data circuitry 170. The data circuitry 170 communicates the signals out0 and out1 to the value memory circuit 152 via the interconnect circuitry 140 based on the interconnect control signal 132. For example, the interconnect circuitry 140 routes the signal out0 to the value memory circuit 152$_5$ and the signal out1 to the value memory circuit 1526 via the interconnect control signal 132.

During a third cycle, the evaluation circuit 1545 receives a corresponding operator control signal 136 from the instruction memory circuitry 130. The evaluation circuit 1545 performs an operation based on the received control signal 136. For example, the evaluation circuit 1545 performs a greater than operation. The evaluation circuit 1545 receives the signals out0 and out1 from the value memory circuit 1525, performs the greater than operation and outputs the signal c2. The signal c2 is output to the communication path 174, which communicates the signal c2 to the data circuitry 170. The data circuitry 170 communicates the signal c2 to the value memory circuit 152 via the interconnect circuitry 140 based on the interconnect control signal 132. For example, the interconnect circuitry 140 routes the signal c2 to the value memory circuit 1526 via the interconnect control signal 132.

During a fourth cycle, the evaluation circuit 1546 receives a corresponding operator control signal 136 from the instruction memory circuitry 130. The evaluation circuit 1546 performs an operation based on the received control signal 136. For example, the evaluation circuit 1546 performs an if-else operation. The evaluation circuit 1546 receives the signals out0 out1, and c2 from the value memory circuit 1526, performs the if-else operation, and outputs the signal out2. The signal out2 is output to the communication path 174, which communicates the signal out2 to the data circuitry 170. The signal out2 is communicated to the trace circuitry 172 for verification of the DUV.

At 550 of the method 500, the functionality of a DUV is verified. For example, the trace circuitry 172 receives the signal out2 and updates a corresponding value. In one or more examples, the trace circuitry 172 further receives the values c0, c1, out0, out1, and c2, and updates corresponding values. The updated values are output to the testing device 180 to be used for verification of the DUV.

In one or more examples, the simulation vector processor system 100 performs hardware congruency simulation. Hardware congruency is a simulation model for RTL descriptions that matches the behavior of the hardware implementing the design. In the hardware congruency model, real hardware exhibits latency and does not undergo instantaneous transitions that occur during modeling and verification. Any 0-delay transitions or glitches are considered an artifact of the simulation, and the transient effects are suppressed. The final (or steady state) disposition of the synchronous system is determined and used during the evaluation of the corresponding circuit design. Further, the inertial delay between edge-triggered state elements is modeled as an infinitesimal delay that prevents registers from storing data that is computed during an overlapping period of time.

Figure 6:
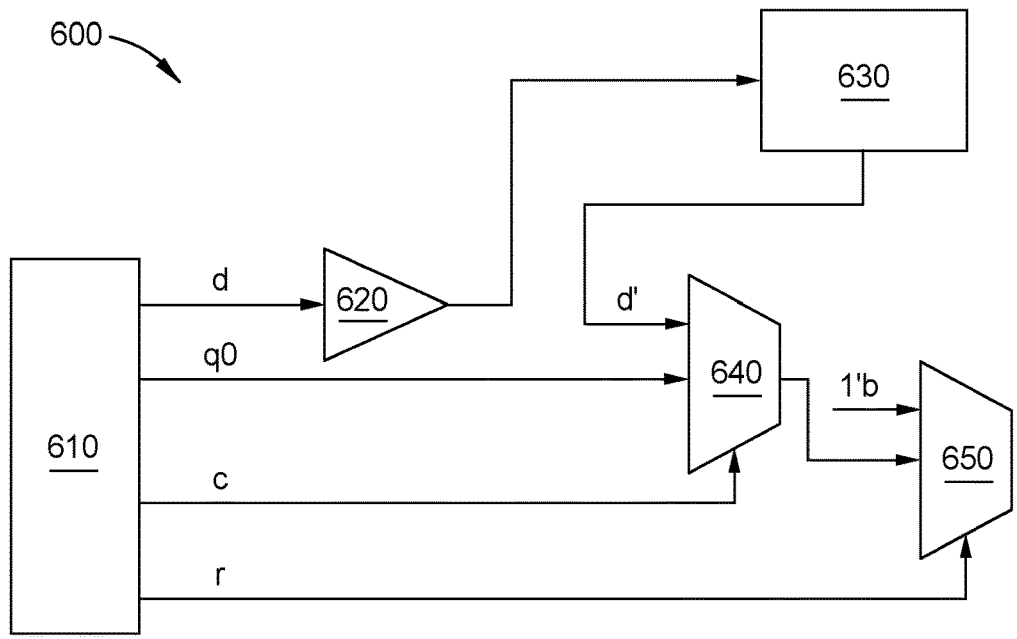
FIG. 6 illustrates a block diagram of a state memory, according to one embodiment of the present disclosure.

FIG. 6 is an example illustration of a state memory 600 for congruency at an operator level, according to an embodiment of the present disclosure. Congruency is implemented for two types of state operators, flops (e.g., flip-flops), and latches. Flops are controlled by edges of a clock signal. Latches are controlled by levels of a clock signal.

The state memory 600 may be executed as part of the simulation vector processor system 100 of FIG. 1. The state memory 600 includes a memory 610 and a memory 630. The memory 610 and 630 may be implemented within the value memory circuits 152. As is described below, the buffer 620 provides the value to be stored to the memory 630. In one example, the state memory 600 is used in conjunction with a flop operation. A flop operation may be broken down into two MUX operations, e.g., MXU 640 and MUX 650. The operations corresponding to the buffer 620, the MUX 640, and the MUX 650 may be implemented by the evaluation circuits 154.

The memory 610 stores values d, values q0, and outputs the values d, the values q0, a control signal c, and a control signal r. The buffer 620 receives the values d and outputs the buffered value d to the memory 630.

The stored value of input value d is referred to as a sampled value d' (sample(d)). The MUX 640 receives the sampled value d' from the memory 630, the output value q0, and the control signal c from the memory 610. The MUX 650 receives the output of the MUX 640 (e.g., output signal 0), a signal 1'b, and the control signal r. The MUX 650 outputs the value q as the output signal of the state memory 600.

In one or more examples, congruency in a flop operation is defined by as: always_ff@(posedge clock)q=data. In a flop operation, to account for congruency of an initial delay between edge triggered flop operators, the value of a data input of the flop is saved at the beginning of a first cycle. The saved value is used to update the output of the flop operation based on the corresponding clock signal having a positive edge.

During the evaluation process, the start (e.g., beginning) of the first cycle (e.g., period) can be defined as time advance (TA). At each TA, the flop operation is executed by the simulation vector processor system 100 in a TA mode. In the TA mode, the value of a data input of the flop operation is saved. The value of the data input is saved to the state memory 600. For example, the value of the data input is saved as input value d in the memory 630. Saving the value d may include saving the input value d into a value memory circuit 152. An evaluation circuit 152 performs a buffer operation of the value d and the buffered value d is communicated to the value memory circuit 152 via the force memory circuitry 160, the communication path 174, the data circuitry 170, and the interconnect circuitry 140. In one example, during evaluation of the corresponding DUV by the simulation vector processor system 100, the sampled data value d' is output based on a positive edge of a clock signal.

Error rejection congruency is implemented by saving the value of a clock signal as sample(clock) in the memory 630 at each TA. Further, the value of the output signal q is saved as sample(q) in the memory 630 at each TA. The value of the output signal is the sample(q) value at TA. Based on the evaluation clock signal used for evaluation of the DUV having a positive edge (e.g., a transition from a low voltage value to a high voltage value) followed by a negative edge (e.g., a transition from the high voltage value to the low voltage value), a clock error is detected as a 0 value of the clock signal is the same as the value of sample(clock). Based on the detected error, the output of the flop operator is sample(q) stored within the memory 610.

Figure 7:
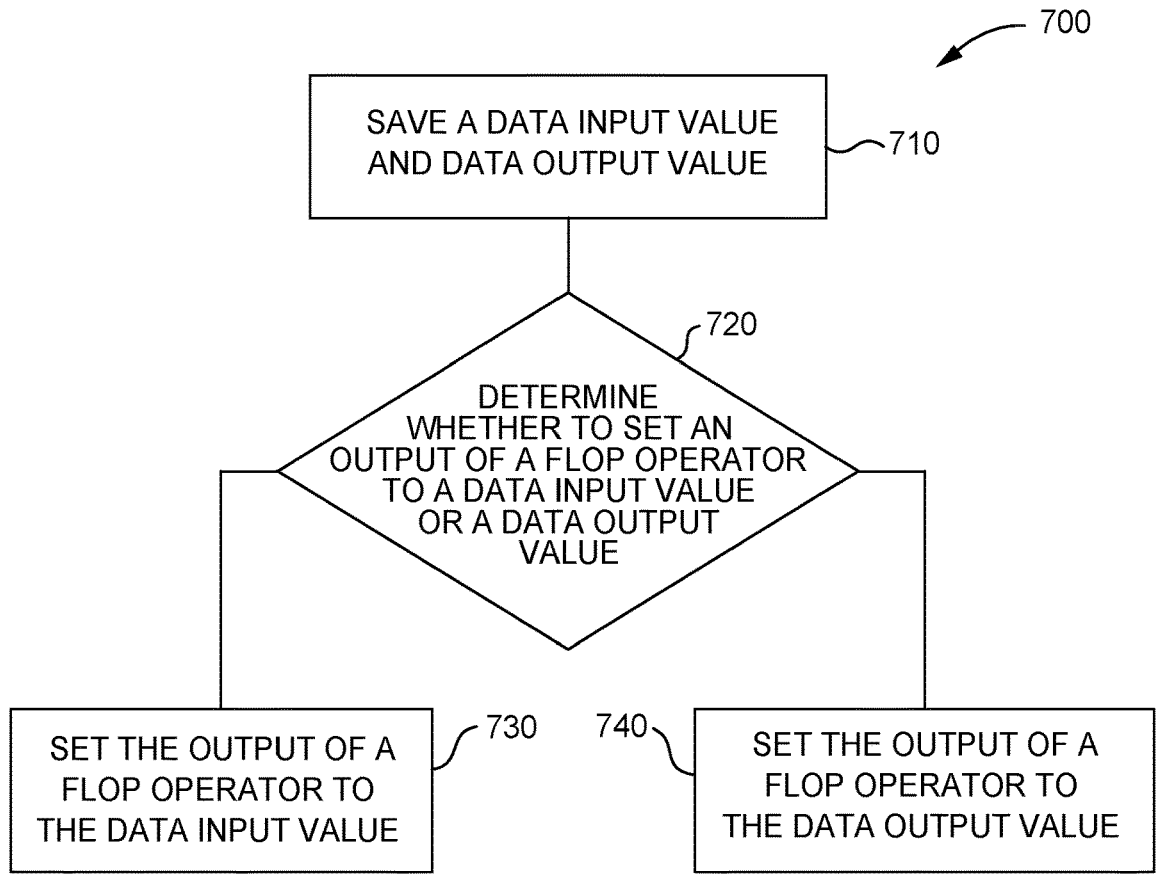
FIG. 7 illustrates a flowchart of a method for preserving congruency within a circuit design, according to one embodiment of the present disclosure.

FIG. 7 illustrates a flowchart of a method 700 for performing congruency within a flop operator, according to an embodiment of the disclosure. The method 700 is performed by the simulation vector processor system 100. At 710 of the method 700, at the beginning of a new simulation time (e.g., TA), the interconnection circuits 140, and one or more evaluation circuits 154 are instructed to save data input (sample(d)) and data output (sample(qout)) in one or more value memory circuits 152 based on the controls signals 132 and 136. For example, one or more of the evaluation circuits 154 is configured as a flop operator based on a control signal 136 and generates the value sample(d) and sample(qout), which are stored in the value memory circuits 152 via the communication path 174, the data circuitry 170, and the interconnection circuitry 140.

At 720 of the method 700, a determination whether to set an output of a flop operator to a data input value or a data output value is made. A determination to set an output of a flop operator to a data input value is made based on detecting a positive edge of a clock signal. In one example, the output of the flop operator is set to the value of value sample(d) based on an active clock signal. In one example, an active clock signal corresponds to detecting a positive edge of a clock signal. In other examples, an active clock signal corresponds to a negative edge of a clock signal. At 730 of the method 740, the output of the flop operator is set to the data input value based the determination made at 720. For example, the output of the flop operator is set to the data input value based on the detection of the positive edge of the clock signal. Setting the output of the flop operator to sample(data) based on an active clocks signal ensures that the output of the flop operator has the correct and stable value. In one example, the instruction memory circuitry 130 generates interconnect control signals 132, read control signals 134$_1$, write control signals 134$_2$, and operation control signals 136 based on the detection of a positive edge. The interconnect control signal 132, read control signals 134$_1$, write control signals 134$_2$, and operation control signals 136 instruct the interconnection circuitry 140, the value memory circuits 152, and the evaluation circuits 154 performing the flop operation to output the value sample (data).

With further reference to 720 of FIG. 7, a determination to set the output value of the flop operator to the data output value is made based on the detection of a glitch signal. For example, a determination to set the output of the flop operator to sample(qout) is made based on detecting a glitch in the clock signal. A clock glitch corresponds to a detection of a positive edge followed by a negative edge of a clock signal within a predetermined time period. The time period is less than a duty cycle of the clock signal. At 740 of the method 700, based on detecting the glitch in the clock signal, the output of the flop operator is set to the data output value (e.g., sample(qout)). Accordingly, based on the detection of a glitch of the clock signal, the output of the flop operator does not change. In one example, the instruction memory circuitry 130 generates interconnect control signal 132, read control signals 134$_1$, write control signals 134$_2$, and operation control signals 136 based on the detection of a glitch. The interconnect control signal 132, read control signals 134$_1$, write control signals 134$_2$, and operation control signals 136 instruct the interconnection circuitry 140, the value memory circuits 152, and the evaluation circuits 154 performing the flop operation to output the value sample (qout).

In one or more examples, the simulation vector processor system 100 performs congruency for a latch operator by saving sample(q) at TA. Based on an enable signal (e.g., signal en) transitioning to a low voltage level (e.g., a 0 value), the output value q is asserted as the value sample(q). Such a process models the inertial delay on change of the data signal. A latch is implemented based on the statement: alway_latch if(en) q=data. The instruction memory circuitry 130 generates interconnect control signal 132, read control signals 134$_1$, write control signals 134$_2$, and operation control signals 136 based on detecting that the enable signal transitioned to a low value. The interconnect control signal 132, read control signals 134$_1$, write control signals 134$_2$, and operation control signals 136 instruct the interconnection circuitry 140, the value memory circuits 152, and the evaluation circuits 154 performing the latch operation to output the value sample(q).

In one or more examples, the simulation vector processor system 100 implements asynchronous control congruency based on a reset control signal, a set control signal, and/or a clock signal. For example, reset control is implemented based on when a value of a reset control signal is 1, an output value of the corresponding operator is set to 0. When a value of the reset control signal is an unknown value (e.g., X value), the output value of the evaluation circuits 154 performing the corresponding operation is based on merging a value of zero with the sampled output value, sample(q). In one example, based on a control signal set may be used to set the output value of the evaluation circuits 154 performing the corresponding operation to 1.

In one or more examples, a dual clock flop operation uses two clock signals and two data signals. Congruency may be implemented by extended the congruency method applied to single clock flop operator as described above to a dual clock flop operation.

In one or more examples, the detection of clock signal edges is used for congruent operation when evaluating a DUV. The clock signal edges are detected a TA. The simulation vector processor system 100 detects the edges of the clock signals. For example, one or more of the evaluation circuits 154 detect the edges of the clock signals. The detected edges are stored in the value memory circuits 152 via the communication path 174. In one or more examples, the detected edges are output to the data circuitry 170 and/or the trace circuitry 172 via the communication path 174 from the evaluation circuits 154.

Clock signal edges correspond to positive edges and negative edges of the clock signal. A clean positive edge corresponds to a transition from a low voltage value to a high voltage value. A clean negative edge corresponds to a transition from a high voltage value to a negative voltage value. An ambiguous positive edge corresponds a transition from an unknown value (e.g., an X value) to a high voltage value or a transition from a low voltage value to an unknown value. An ambiguous negative edge corresponds to a transition from a high voltage value to an unknown value and from an unknown value to a low voltage value.

In one example, a glitch in a clock signal is determined based on the detection of a negative edge when the stored clock signal value is 0 (e.g., a low voltage value) and based on the detection of a positive edge when the stored clock signal value is 1 (e.g., a high voltage value). The evaluation circuits 154 detect the edges of the clock signals and detect a glitch based on the detected edges of the clock signals.

In one example, a glitch in a clock signal is determined based on the detection of a negative edge when the stored clock signal value is 0 (e.g., a low voltage value) and based on the detection of a positive edge when the stored clock signal value is 1 (e.g., a high voltage value).

In one or more examples, in an unknown value (e.g., an X value) propagation mode, based on ambiguous clock edges, an output value (e.g., the output signal from one or more evaluation circuits 154) is based on the merged sample (q) value and sample(d) value (q=merge(sample(q), sample (d)). In an error rejection mode, based on ambiguous clock edges, one or more of the evaluation circuits 154 output an output value q having a value of sample(q). In an optimistic edge mode, based on the detection of clean clock edges and ambiguous clock edges, one or more of the evaluation circuits 154 output the output value q having a value of sample(d) for flop operator triggered based on the edge of a clock signal.

Figure 8:
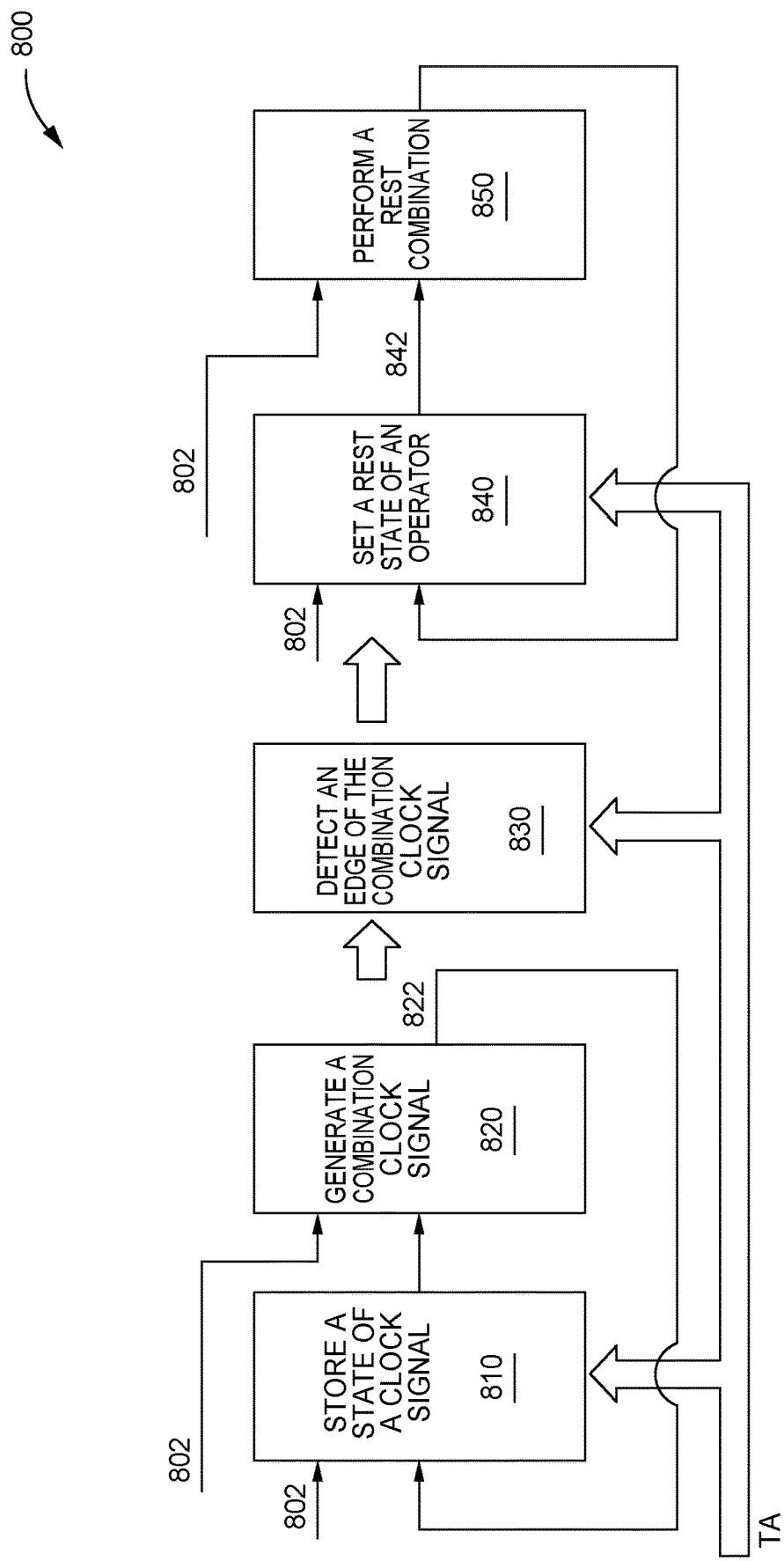
FIG. 8 illustrates a method for tracking a clock signal, according to one embodiment of the present disclosure.

FIG. 8 illustrates congruent simulation 800, according to an embodiment of the present disclosure. In one example, congruent simulation 800 is executed by the simulation vector processor system 100 of FIG. 1. Congruent simulation 800 includes 810, storing a state (e.g., a clock signal value) of a clock signal at TA. For example, a state of the clock signal 802 is saved at 810 by the simulation vector processor system 100. In one example, the state of the clock signal 802 is stored by the simulation vector processor system 100 within one or more of the value memory circuits 152.

At 820 of 800, a combination clock signal is generated. The combination clock signal is generated by one or more of the evaluation circuits 154 based on a clock state stored at 810 and the clock signal 802 stored within one or more of value memory circuits 152. One or more of the evaluation circuits 154 generate the combination clock signal by performing an OR function based on the stored clock stage and the clock signal 802. In another example, one or more of the evaluation circuits 154 generate the combination clock signal be performing an AND function based on the stored clock stage and the clock signal 802. The combination clock signal 822 is fed back to 810 and used to generate and store the state of the clock signal 802. For example, the combination clock signal 822 is communicated to the value memory circuits 152 via the communication path 174 and the interconnection circuitry 140. The combination clock signal 822 is received by one or more of the evaluation circuits 154, which generate the state of the clock signal 802 which is stored in one or more of the value memory circuits 152 via the communication path 174 and the interconnection circuitry 140.

At 830, an edge of the combination clock signal 822 is detected. For example, one or more the evaluation circuits 154 detect positive and/or negative edges of the combination clock signal 822. At 840, the state of an operator (e.g., flop operator or latch operator, among others) that is external to the clock generating logic (domain) is set. For example, one or more of the evaluation circuits 154 are set to perform an operation corresponding to logic that is external to the clock generating logic. At 850, a combination is performed on the circuit elements that are external to the clock generating logic based on the output 842 of 840 and the clock signal 802. For example, the evaluation circuits 154 perform an OR operation or an AND operation based on the logic that is external to the clock generating logic. The output 850 is fed back to 840. For example, the outputs of the evaluation circuits 154 is provided to the value memory circuits and used in further operations.

Figure 9:
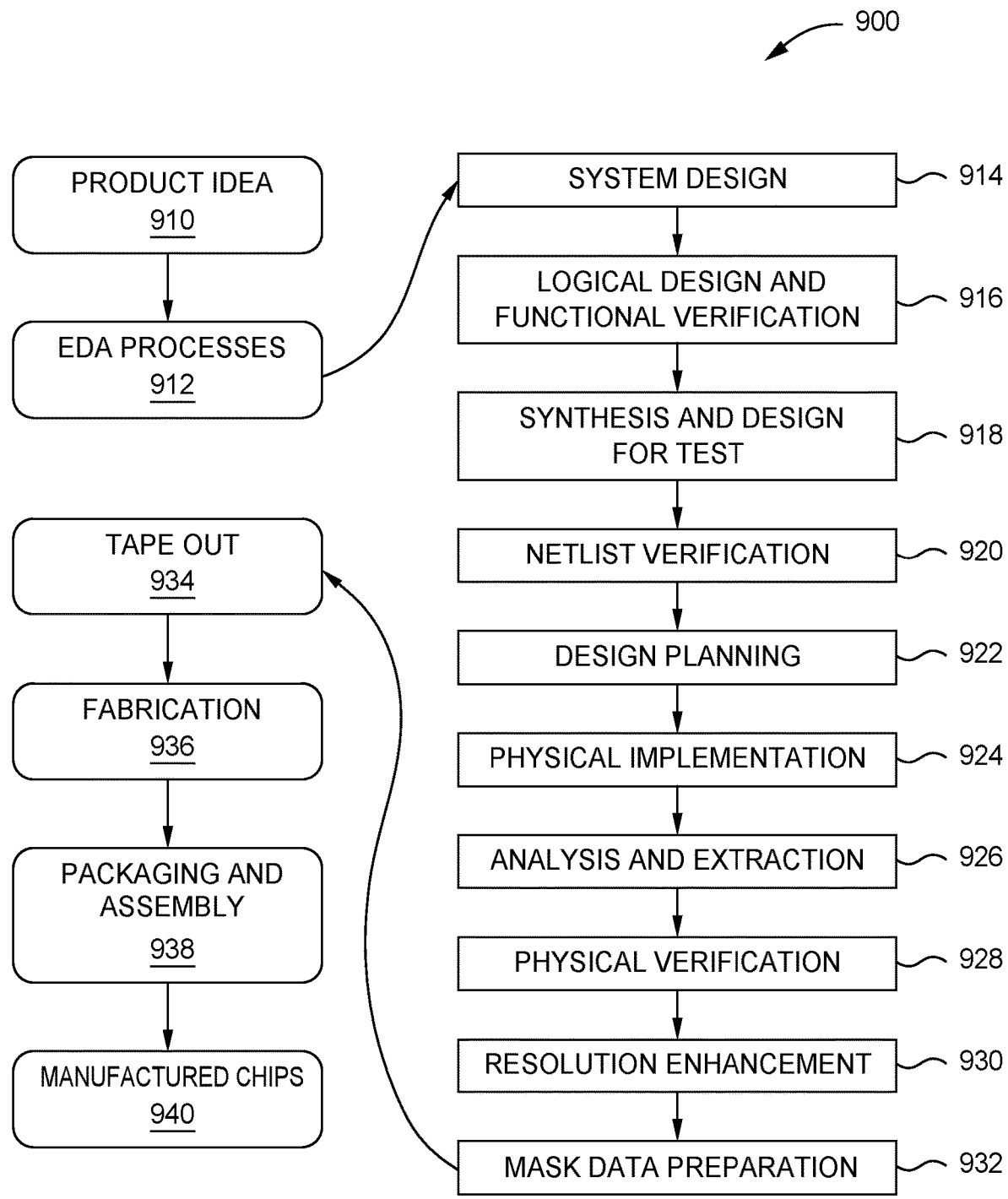
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 11) may be used to store the programs and data structures that are used by some or all of the EDA products described herein, and products used for development of cells for the library and for physical and logical design that use the library.

Figure 10:
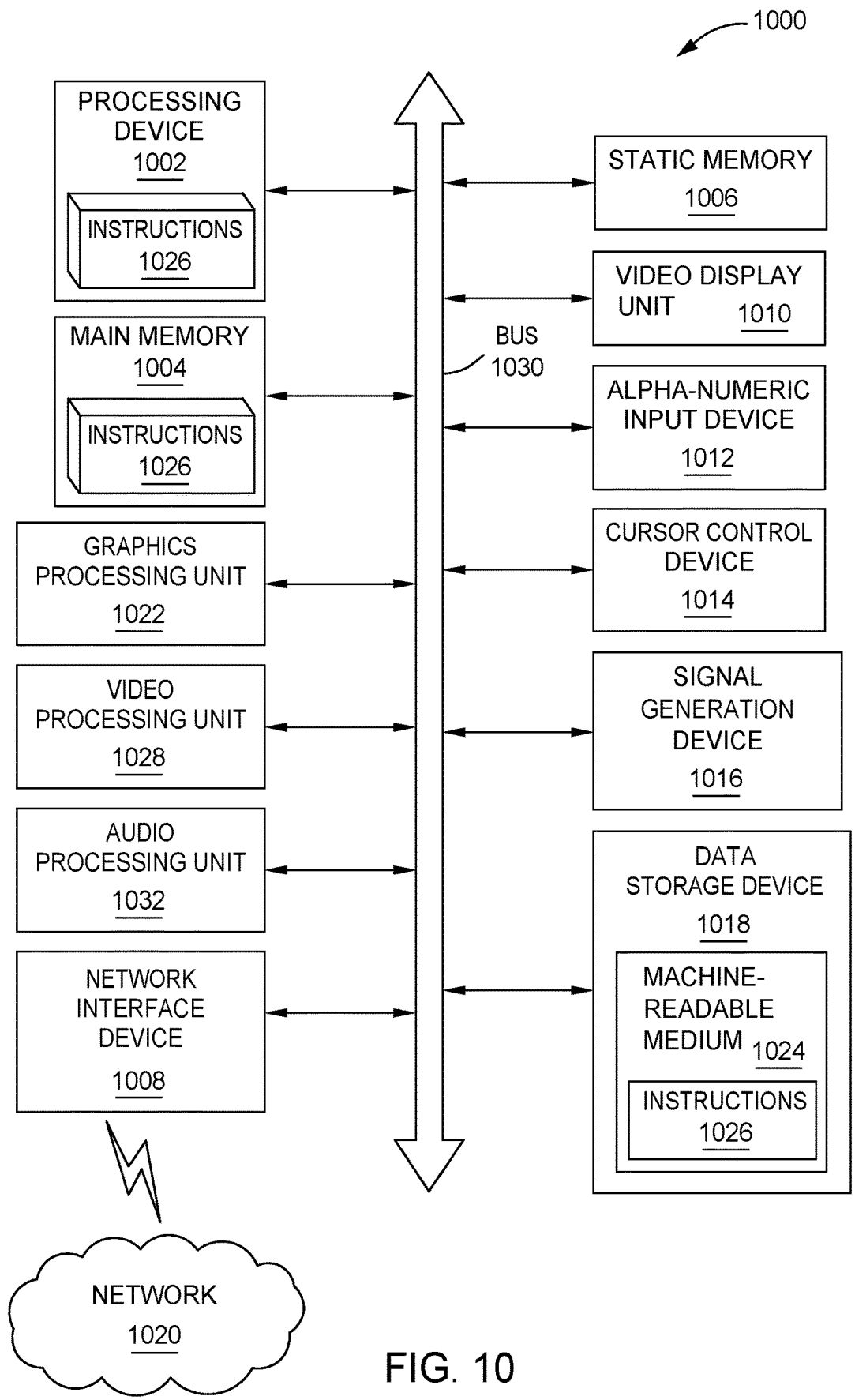
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A processing system comprising:
a flow processor configured to generate instructions based on an input signal associated with a circuit design; and
an evaluation system electrically coupled with the flow processor, where the evaluation system is configured to receive the instructions and perform operations of the circuit design based on the instructions, the evaluation system comprising:
instruction memory circuitry configured to receive the instructions from the flow processor and generate control signals;
interconnect circuitry electrically coupled to the instruction memory circuitry, where the interconnect circuitry is configured to receive the control signals and a plurality of values, and route the plurality of values based on the control signals, each of the plurality of values having one of four states; and
operation circuitry electrically coupled to the interconnect circuitry and the instruction memory circuitry, the operation circuitry comprising value memory circuits and evaluation circuits, the operation circuitry configured to:
receive the plurality of values and the control signals;
perform one or more operations of the circuit design with the plurality of values based on the control signals, wherein the control signals indicate a value of the plurality of values used by the evaluation circuits to perform the one or more operations and are used to select a value memory circuit of the value memory circuits to be written to by the evaluation circuits; and
output operation values based on performing the one or more operations, the operation values indicative of an error within the circuit design.

2. The processing system of claim 1, wherein the four states include a state of logic value 0, a state of logic value 1, an unknown state, and a tristate.

3. The processing system of claim 1, wherein a state of each of the plurality of values is represented, respectively, by a first signal and a second signal.

4. The processing system of claim 1, wherein the flow processor is further configured to detect an edge of a clock signal and generate the instructions based on detecting the edge of the clock signal.

5. The processing system of claim 1, wherein the value memory circuits comprise a first value memory circuit configured to receive a first value of the plurality of values, and output the first value, and
the evaluation circuits are electrically coupled to the value memory circuits, the evaluation circuits comprising:
a first evaluation circuit configured to receive the first value from first value memory circuit and perform a first operation of the one or more operations with the first value based on the control signals.

6. The processing system of claim 5, wherein:
the value memory circuits further comprise a second value memory circuit configured to receive the first value, and output the first value to a second evaluation circuit of the evaluation circuits based on the control signals; and
the second evaluation circuit is configured to receive the first value from the second value memory circuit and perform the first operation with the first value based on the control signals.

7. The processing system of claim 5, wherein the interconnect circuitry is configured to route the first value to the first value memory circuit based on the control signals.

8. The processing system of claim 5, wherein the first evaluation circuit is configured to output a third value based on performing the first operation with the first value, and wherein the interconnect circuitry is configured to receive the third value and output the third value to a second value memory circuit of the value memory circuits.

9. The processing system of claim 5, wherein the first evaluation circuit is configured to output a second value based on performing the first operation with the first value, wherein the second value has an unknown state based on a bit of the first value having an unknown state.

10. The processing system of claim 1, wherein the operation circuitry further comprises force memory circuitry configured to receive the control signals from the instruction memory circuitry, and change a value of the operation values based on the control signals.

11. A method comprising:
  generating, via a flow processor, instructions based on an input signal associated with a circuit design; and
  generating, via instruction memory circuitry of an evaluation system coupled with the flow processor, control signals from the instructions;
  routing, via interconnect circuitry of the evaluation system, a plurality of values based on the control signals, each of the plurality of values having four states, the interconnect circuitry electrically coupled to the instruction memory circuitry;
  performing, via operation circuitry of the evaluation system, one or more operations of the circuit design with the plurality of values based on the control signals, the operation circuitry electrically coupled to the interconnect circuitry and the instruction memory circuitry and comprising value memory circuits and evaluations circuits, wherein the control signals indicate a value of the plurality of values by the evaluation circuits to perform the one or more operations and are used to select a value memory circuit of the value memory circuits to be written to by the evaluation circuits; and
  outputting operation values based on performing the one or more operations, the operation values indicative of an error within the circuit design.

12. The method of claim 11, wherein the four states include a state of logic value 0, a state of logic value 1, an unknown state, and a tristate.

13. The method of claim 11, further comprising detect an edge of a clock signal of the circuit design and generating the instructions based on detecting the edge of the clock signal.

14. The method of claim 11, further comprising:
  receiving, via a first value memory circuit of the value memory circuits, a first value of the plurality of values;
  performing, via a first evaluation circuit of the evaluation circuits, a first operation of the one or more operations with the first value based on the control signals.

* * * * *